US012678736B2

(12) United States Patent
Nam

(10) Patent No.: US 12,678,736 B2
(45) Date of Patent: Jul. 14, 2026

(54) APPARATUS FOR REDUCING GREENHOUSE GAS EMISSION IN VESSEL AND VESSEL INCLUDING THE SAME

(71) Applicant: DAEWOO SHIPBUILDING & MARINE ENGINEERING CO., LTD., Geoje-si (KR)

(72) Inventor: Byung Tak Nam, Geoje-si (KR)

(73) Assignee: DAEWOO SHIPBUILDING & MARINE ENGINEERING CO., LTD., Geoje-si (KR)

( * ) Notice: Subject to any disclaimer, the term of this patent is extended or adjusted under 35 U.S.C. 154(b) by 763 days.

(21) Appl. No.: 18/031,352

(22) PCT Filed: Dec. 17, 2020

(86) PCT No.: PCT/KR2020/018603
§ 371 (c)(1),
(2) Date: Apr. 12, 2023

(87) PCT Pub. No.: WO2022/092428
PCT Pub. Date: May 5, 2022

(65) Prior Publication Data
US 2023/0372867 A1    Nov. 23, 2023

(30) Foreign Application Priority Data

Oct. 26, 2020    (KR) ........................ 10-2020-0139682
Nov. 18, 2020    (KR) ........................ 10-2020-0154964

(51) Int. Cl.
B01D 53/96        (2006.01)
B01D 53/14        (2006.01)
(Continued)

(52) U.S. Cl.
CPC ......... B01D 53/96 (2013.01); B01D 53/1406 (2013.01); B01D 53/1425 (2013.01);
(Continued)

(58) Field of Classification Search
CPC ..... B63J 4/00; F02B 2043/00; F02B 2043/10; F02B 2043/103; F02G 5/00; F02G 5/02
See application file for complete search history.

(56) References Cited

U.S. PATENT DOCUMENTS

| | | | |
|---|---|---|---|
| 8,486,482 B2 * | 7/2013 | Wang | ..................... A61L 31/10 |
| | | | 424/94.4 |
| 2008/0173588 A1 | 7/2008 | Borseth | |
| 2013/0287673 A1 | 10/2013 | Wang et al. | |

FOREIGN PATENT DOCUMENTS

| | | | | |
|---|---|---|---|---|
| CA | 3056199 A1 * | 2/2019 | ............ | B01D 53/78 |
| EP | 3643391 A2 | 4/2020 | | |

(Continued)

OTHER PUBLICATIONS

International Search Report in International Application No. PCT/KR2020/018603, dated Jul. 23, 2021, 3pages.

*Primary Examiner* — Natasha E Young
(74) *Attorney, Agent, or Firm* — Park, Kim & Suh, LLC

(57)        ABSTRACT
The present invention relates to an apparatus for reducing greenhouse gas emission in a vessel and a vessel including the same, in which an absorbent liquid recycling unit is provided in two or more stages so that an unreacted aqueous ammonium salt solution remaining in ammonia water is removed to maintain a concentration of ammonia water at a certain level, thereby increasing a recovery rate of an absorbent liquid and preventing a deterioration in greenhouse gas absorption performance. Or in which exhaust gas is cooled by a heat exchange method, thereby preventing a decrease in a concentration of an absorbent liquid, and an absorbent liquid recycling unit is provided in two or more stages so that an unreacted aqueous ammonium salt solution remaining in ammonia water is removed, thereby increasing a recovery rate of the absorbent liquid and preventing a deterioration in greenhouse gas absorption performance.

20 Claims, 16 Drawing Sheets

(51) Int. Cl.

| | |
|---|---|
| *B01D 53/18* | (2006.01) |
| *B01D 53/50* | (2006.01) |
| *B01D 53/62* | (2006.01) |
| *B01D 53/94* | (2006.01) |
| *B63J 4/00* | (2006.01) |
| *F01N 3/04* | (2006.01) |
| *F01N 3/20* | (2006.01) |

(52) U.S. Cl.

CPC ..... *B01D 53/1431* (2013.01); *B01D 53/1475* (2013.01); *B01D 53/1481* (2013.01); *B01D 53/1493* (2013.01); *B01D 53/18* (2013.01); *B01D 53/507* (2013.01); *B01D 53/62* (2013.01); *B01D 53/9418* (2013.01); *B63J 4/00* (2013.01); *F01N 3/043* (2013.01); *F01N 3/2066* (2013.01); *B01D 2251/2062* (2013.01); *B01D 2251/2067* (2013.01); *B01D 2252/102* (2013.01); *B01D 2252/1035* (2013.01); *B01D 2257/302* (2013.01); *B01D 2257/404* (2013.01); *B01D 2257/504* (2013.01); *B01D 2258/01* (2013.01); *F01N 2610/02* (2013.01); *F01N 2610/1406* (2013.01)

(56) References Cited

FOREIGN PATENT DOCUMENTS

| | | | |
|---|---|---|---|
| JP | S62-170469 | A | 7/1987 |
| JP | H04-346821 | A | 12/1992 |
| JP | 2010-502420 | A | 1/2010 |
| JP | 2010-531728 | A | 9/2010 |
| JP | 2015-536237 | A | 12/2015 |
| JP | 2019-510628 | A | 4/2019 |
| KR | 10-1201426 | B1 | 11/2012 |
| KR | 10-2013-0047470 | A | 5/2013 |
| KR | 10-1379856 | B1 | 4/2014 |
| KR | 10-1381833 | B1 | 4/2014 |
| KR | 10-2016-0079801 | A | 7/2016 |
| KR | 10-2018-0006059 | A | 1/2018 |
| KR | 10-2018-0019890 | A | 2/2018 |
| KR | 10-2019-113486 | A | 10/2019 |
| KR | 10-2031210 | B1 | 10/2019 |
| KR | 10-2020-0084288 | A | 7/2020 |
| KR | 10-2020-0084538 | A | 7/2020 |
| KR | 10-2020-0114027 | A | 10/2020 |

* cited by examiner (a)

Ceramic Raschig rings    Ceramic Berl saddle    Ceramic Intalox saddle    Plastic super Intalox saddle Metal Intalox IMTP    Metal Pall ring    Plastic Flexiring    Metal Bialecki ring Metal Fleximax    Metal Cascade Mini-ring {CMR}    Metal Top-pak    Metal Raschig Super-ring Plastic Tellerette    Plastic Hackett    Plastic Hiflow ring    Metal VSP ring (a)

Ceramic Raschig rings

Ceramic Berl saddle

Ceramic Intalox saddle

Plastic super Intalox saddle

Metal Intalox IMTP

Metal Pall ring

Plastic Flexiring

Metal Bialecki ring

Metal Fleximax

Metal Cascade Mini-ring (CMR)

Metal Top-pak

Metal Raschig Super-ring

Plastic Tellerette

Plastic Hackett

Plastic Hiflow ring

Metal VSP ring (a)

(b)

APPARATUS FOR REDUCING GREENHOUSE GAS EMISSION IN VESSEL AND VESSEL INCLUDING THE SAME

CROSS-REFERENCE TO RELATED APPLICATIONS

This application is the National Stage filing under 35 U.S.C. 371 of International Application No. PCT/KR2023/018603, now WO 2022/092428, filed on Dec. 17, 2020, which claims the benefit of Korean Patent Application No. 10-2020-0139682, filed on Oct. 26, 2020 and Korean Patent Application No. 10-2020-0154964, filed on Nov. 18, 2020, the contents of which are all hereby incorporated by reference herein in their entirety.

TECHNICAL FIELD

The present invention relates to an apparatus for reducing greenhouse gas emission in a vessel and a vessel including the same, in which an absorbent liquid recycling unit is provided in two or more stages so that an unreacted aqueous ammonium salt solution remaining in ammonia water is removed to maintain a concentration of ammonia water at a certain level, thereby increasing a recovery rate of an absorbent liquid and preventing a deterioration in greenhouse gas absorption performance.

The present invention relates to an apparatus for reducing greenhouse gas emission in a vessel and a vessel including the same, in which exhaust gas is cooled by a heat exchange method, thereby preventing a decrease in a concentration of an absorbent liquid, and an absorbent liquid recycling unit is provided in two or more stages so that an unreacted aqueous ammonium salt solution remaining in ammonia water is removed, thereby increasing a recovery rate of the absorbent liquid and preventing a deterioration in greenhouse gas absorption performance.

BACKGROUND ART

Recently, global warming and related environmental disasters have occurred due to the influence of greenhouse gas emission caused by indiscriminate use of fossil fuels.

In this regard, a series of technologies related to capture and storage of carbon dioxide, which is the representative greenhouse gas, without carbon dioxide emission are called carbon dioxide capture and storage (CCS) technologies. In recent years, CCS technologies have attracted much attention. Among CCS technologies, chemical absorption is the most commercialized technology in terms of enabling large-scale treatment.

In addition, carbon dioxide emission is regulated through the IMO's EEDI. The IMO is targeting a reduction of 50% or more in emissions by 2050 compared to 2008 and a reduction of 40% in emissions by 2030 compared to 2008. Therefore, technologies that do not emit $CO_2$ or capture emitted $CO_2$ are attracting attention.

For reference, among the carbon dioxide capture and storage (CCS) technologies for directly capturing and storing carbon dioxide, a $CO_2$ capture technology may be approached in various ways according to $CO_2$ generation conditions of target processes. Current representative technologies are an absorption method, an adsorption method, and a membrane separation method. Among them, the wet absorption method has high technological maturity in onshore plants and may easily process $CO_2$ in large quantities. Therefore, the wet absorption method may be said to be the closest capture technology to commercialization of CCS technology. As an absorbent agent, amines and ammonia are mainly used.

On the other hand, the above-described technologies for reducing carbon dioxide emission or capturing generated carbon dioxide are not currently commercialized in vessels, and methods of using hydrogen or ammonia as fuel are currently under development and have not reached the level of commercialization.

Furthermore, the need is raised to apply, to vessels, a technology for absorbing $CO_2$, which is greenhouse gas among exhaust gases emitted from a vessel engine, with an absorbent liquid, converting $CO_2$ into materials that do not affect environments, discharging the materials, or converting $CO_2$ into useful materials and storing the useful materials, and preventing the deterioration in absorption performance due to the change in concentration of absorbent liquid.

Furthermore, the need is raised to apply, to vessels using LNG or low sulphur fuel oil so as to emit a small amount of $SO_x$ or prevent $SO_x$ emission, a technology for absorbing $CO_2$, which is one of exhaust gases emitted from a vessel engine, with an absorbent liquid, converting $CO_2$ into materials that do not affect environments, discharging the materials, or converting $CO_2$ into useful materials and storing the useful materials, preventing the decrease in concentration of absorbent liquid due to cooling of exhaust gas by seawater, and preventing the decrease in absorption performance due to concentration change caused by repeated circulation of absorbent liquid.

DISCLOSURE

Technical Problem

An object of the present invention is to provide an apparatus for reducing greenhouse gas emission in a vessel and a vessel including the same, in which an absorbent liquid recycling unit is provided in two or more stages so that an unreacted aqueous ammonium salt solution remaining in ammonia water is removed to maintain a concentration of ammonia water at a certain level, thereby increasing a recovery rate of an absorbent liquid and preventing a deterioration in greenhouse gas absorption performance.

Also, an object of the present invention is to provide an apparatus for reducing greenhouse gas emission in a vessel and a vessel including the same, in which exhaust gas is cooled by a heat exchange method, thereby preventing a decrease in a concentration of an absorbent liquid, and an absorbent liquid recycling unit is provided in two or more stages so that an unreacted aqueous ammonium salt solution remaining in ammonia water is removed, thereby increasing a recovery rate of the absorbent liquid and preventing a deterioration in greenhouse gas absorption performance.

Technical Solution

In order to achieve the object described above, the present invention provides an apparatus for reducing greenhouse gas emission in a vessel, the apparatus including: a seawater supply unit that supplies seawater; an absorbent liquid producing unit that produces and supplies a high-concentration $CO_2$ absorbent liquid; an absorption tower including a $CO_2$ removing unit that cools exhaust gas discharged from a vessel engine by reacting the exhaust gas with the seawater supplied from the seawater supply unit, and removes $CO_2$ by reacting the cooled exhaust gas with the absorbent liquid supplied from the absorbent liquid producing unit to convert $CO_2$ into an aqueous ammonium salt solution; and an absorbent liquid recycling unit including a primary recycling unit that primarily recycles the absorbent liquid by reacting the aqueous ammonium salt solution discharged from the absorption tower with an aqueous divalent metal hydroxide solution, and a secondary recycling unit that secondarily recycles the high-concentration absorbent liquid by additionally reacting the aqueous divalent metal hydroxide solution with an unreacted aqueous ammonium salt solution supplied from the primary recycling unit and circulates and supplies the recycled absorbent liquid to the absorption tower for reuse as the absorbent liquid.

In addition, the absorbent liquid recycling unit may include: a storage tank that stores the aqueous divalent metal hydroxide solution; the primary recycling unit including a mixing tank in which the aqueous divalent metal hydroxide solution and the aqueous ammonium salt solution discharged from the absorption tower are stirred by an agitator to generate $NH_3(g)$ and carbonate, and a primary filter that suctions a solution and precipitate from the mixing tank and separates the carbonate; and a secondary recycling unit including a primary absorbent liquid storage tank that stores the unreacted aqueous ammonium salt solution or the ammonia water separated by the primary filter and re-reacts the unreacted aqueous ammonium salt solution with the aqueous divalent metal hydroxide solution supplied from the storage tank, a secondary filter that suctions the solution and precipitate from the primary absorbent liquid storage tank to separate carbonate and high-concentration ammonia water, and a secondary absorbent liquid storage tank that stores the high-concentration ammonia water separated by the secondary filter.

In addition, the storage capacity of the primary absorbent liquid storage tank may be at least three times the capacity of the absorbent liquid circulating through the absorption tower and the absorbent liquid recycling unit.

In addition, the primary absorbent liquid storage tank may include: an agitator that stirs and reacts the aqueous divalent metal hydroxide solution and the unreacted aqueous ammonium salt solution or the ammonia water separated by the primary filter; and a pH sensor that measures the degree of reaction by the agitator.

In addition, the aqueous divalent metal hydroxide solution stored in the storage tank may be $Ca(OH)_2$ or $Mg(OH)_2$ produced by reacting fresh water with CaO or MgO.

In addition, fresh water or ammonia water separated by the secondary filter may be supplied to the secondary absorbent liquid storage tank, or surplus fresh water additionally generated by the mixing tank relative to a total circulating fresh water may be stored in a fresh water tank and reused when the aqueous divalent metal hydroxide solution is generated in the storage tank.

In addition, the absorption tower may further include a $SO_x$ absorbing unit that dissolves and removes $SO_x$ while cooling the exhaust gas discharged from the vessel engine by reacting the exhaust gas with the seawater supplied from the seawater supply unit, and the $CO_2$ removing unit may cool the exhaust gas, from which the $SO_x$ has been removed, by reacting the exhaust gas with the seawater supplied from the seawater supply unit and may remove $CO_2$ by reacting the cooled exhaust gas with the absorbent liquid supplied from the absorbent liquid producing unit to convert $CO_2$ into the aqueous ammonium salt solution.

In addition, the absorption tower may further include a $NO_x$ absorbing unit that absorbs and removes $NO_x$ from the exhaust gas emitted from the vessel engine, and the $CO_2$ removing unit may cool the exhaust gas, from which the $NO_x$ has been removed, by reacting the exhaust gas with the seawater supplied from the seawater supply unit and may remove $CO_2$ by reacting the cooled exhaust gas with the absorbent liquid supplied from the absorbent liquid producing unit to convert $CO_2$ into the aqueous ammonium salt solution.

In addition, in the absorption tower, a $NO_x$ absorbing unit that absorbs and removes $NO_x$ from the exhaust gas discharged from the vessel engine, a $SO_x$ absorbing unit that dissolves and removes $SO_x$ while cooling the exhaust gas, from which the $NO_x$ has been removed, through reaction with the seawater supplied from the seawater supply unit, and the $CO_2$ removing unit that removes $CO_2$ by reacting the exhaust gas, from which the $SO_x$ has been removed, with the absorbent liquid supplied from the absorbent liquid producing unit to convert $CO_2$ into the aqueous ammonium salt solution may be sequentially stacked.

In addition, $NH_3$ recycled by the absorbent liquid recycling unit may be returned back to the absorption tower and converted into the absorbent liquid for reuse as the absorbent liquid, and the $NO_x$ absorbing unit may receive the $NH_3$ recycled by the absorbent liquid recycling unit to absorb $NO_x$ with the $NH_3$, or may absorb $NO_x$ using urea water.

In addition, the seawater supply unit may include: a seawater pump that receives seawater from the outside of the vessel through a sea chest and pumps the seawater to the $SO_x$ absorbing unit; and a seawater control valve that controls a spray amount of the seawater supplied from the seawater pump to the $SO_x$ absorbing unit according to an amount of the exhaust gas.

In addition, the absorbent liquid producing unit may include: a fresh water tank that stores fresh water; a fresh water control valve that supplies the fresh water from the fresh water tank; a $NH_3$ storage that stores high-pressure $NH_3$; an ammonia water tank that produces and stores high-concentration ammonia water, which is the absorbent liquid, by spraying the $NH_3$ supplied from the $NH_3$ storage to the fresh water supplied by the fresh water control valve; a pH sensor that measures a concentration of the ammonia water in the ammonia water tank; and an ammonia water supply pump that supplies the ammonia water from the ammonia water tank to the secondary absorbent liquid storage tank.

In addition, the apparatus may further include an ammonia water circulation pump that circulates the ammonia water from the secondary absorbent liquid storage tank to the absorption tower.

In addition, the $SO_x$ absorbing unit may include: a multi-stage seawater spray nozzle that sprays the seawater supplied from the seawater supply unit downward; and a partition wall-shaped exhaust gas inlet pipe that prevents cleaning water from flowing back, or an umbrella-shaped blocking plate that covers the exhaust gas inlet pipe.

In addition, porous upper plates having a passage through which the exhaust gas passes may be respectively formed in multi-stages under the seawater spray nozzle, so that the seawater and the exhaust gas come into contact with each other.

In addition, an absorption apparatus filled with a packing material for allowing the seawater and the exhaust gas to come into contact with each other may be formed under the seawater spray nozzle, so that the seawater dissolves the $SO_x$.

In addition, the $CO_2$ removing unit may include: an ammonia water spray nozzle that sprays the absorbent liquid supplied from the absorbent liquid recycling unit downward; a packing material that contacts the $CO_2$ with the ammonia water, which is the absorbent liquid, to convert the $CO_2$ into $NH_4HCO_3$(aq); a cooling jacket that is formed in multi-stages for each section of an absorption apparatus filled with the packing material and cools heat generated by a $CO_2$ absorption reaction; a water spray that collects $NH_3$ discharged to the outside without reacting with $CO_2$; a mist removal plate that is formed in a curved multi-plate shape and returns the ammonia water toward the packing material; a partition wall that is formed so that the ammonia water does not flow back; and an umbrella-shaped blocking plate that covers an exhaust gas inlet hole surrounded by the partition wall.

In addition, the packing material may include multi-stage distilling column packings designed to increase a contact area per unit volume, and a solution redistributor may be formed between the multi-stage distilling column packings.

In addition, the absorption tower may further include an exhaust gas economizer (EGE) that is formed between the $NO_x$ absorbing unit and the $SO_x$ absorbing unit and performs heat exchange between waste heat of the vessel engine and boiler water.

In addition, the apparatus may further include a discharge unit including: a cleaning water tank that stores cleaning water discharged from the absorption tower; a water treatment device including a filtering unit that controls turbidity to satisfy an outboard discharge condition of the cleaning water transferred to the cleaning water tank by a transfer pump, and a neutralizing agent injecting unit that controls pH; and a sludge storage tank that separates and stores solid emissions.

On the other hand, the present invention may provide a vessel including the above-described apparatus.

In order to achieve another object described above, the present invention provides an apparatus for reducing greenhouse gas emission in a vessel, the apparatus including: an exhaust gas cooling unit that cools exhaust gas discharged from a vessel engine; an absorbent liquid producing unit that produces and supplies a high-concentration $CO_2$ absorbent liquid; an absorption tower including a $CO_2$ removing unit that removes $CO_2$ by reacting the exhaust gas cooled by the exhaust gas cooling unit with the absorbent liquid supplied from the absorbent liquid producing unit to convert $CO_2$ into an aqueous ammonium salt solution; and an absorbent liquid recycling unit including a primary recycling stage that primarily recycles the absorbent liquid by reacting the aqueous ammonium salt solution discharged from the absorption tower with an aqueous divalent metal hydroxide solution, and a secondary recycling stage that secondarily recycles the high-concentration absorbent liquid by additionally reacting the aqueous divalent metal hydroxide solution with an unreacted aqueous ammonium salt solution supplied from the primary recycling stage and circulates and supplies the recycled absorbent liquid to the absorption tower for reuse as the absorbent liquid.

In addition, the vessel engine may use liquefied natural gas (LNG) or low sulphur marine gas oil (LSMGO) as fuel.

Apparatus for reducing greenhouse gas emission in a vessel.

In addition, the exhaust gas cooling unit may cool the exhaust gas to a temperature of 27° C. to 33° C. by circulating fresh water supplied from an onboard cooling system through a heat exchange pipe surrounding an exhaust gas discharge pipe.

In addition, the absorbent liquid recycling unit may include: a storage tank that stores the aqueous divalent metal hydroxide solution; the primary recycling stage including a mixing tank in which the aqueous ammonium salt solution discharged from the absorption tower and the aqueous divalent metal hydroxide solution supplied from the storage tank are stirred by an agitator to generate $NH_3$(g) and carbonate, and a primary filter that suctions a solution and precipitate from the mixing tank and separates the carbonate; and the secondary recycling stage including: a primary absorbent liquid storage tank that stores the unreacted aqueous ammonium salt solution or the ammonia water separated by the primary filter and re-reacts the unreacted aqueous ammonium salt solution with the aqueous divalent metal hydroxide solution supplied from the storage tank; a secondary filter that suctions the solution and precipitate from the primary absorbent liquid storage tank to separate carbonate and high-concentration ammonia water; and a secondary absorbent liquid storage tank that stores the high-concentration ammonia water separated by the secondary filter.

In addition, the storage capacity of the primary absorbent liquid storage tank is at least three times the capacity of the absorbent liquid circulating through the absorption tower and the absorbent liquid recycling unit along an absorbent liquid circulation line.

In addition, the primary absorbent liquid storage tank may include: an agitator that stirs and reacts the aqueous divalent metal hydroxide solution supplied from the storage tank and the unreacted aqueous ammonium salt solution or the ammonia water separated by the primary filter; and a pH sensor that measures the degree of reaction by the agitator.

In addition, the aqueous divalent metal hydroxide solution stored in the storage tank may be $Ca(OH)_2$ or $Mg(OH)_2$ produced by reacting fresh water with CaO or MgO.

In addition, fresh water or ammonia water separated by the secondary filter may be supplied to the secondary absorbent liquid storage tank, or surplus fresh water additionally generated by the mixing tank relative to a total circulating fresh water may be stored in a fresh water tank and reused when the aqueous divalent metal hydroxide solution is generated in the storage tank.

In addition, the absorption tower may further include a $NO_x$ absorbing unit that absorbs and removes $NO_x$ from the exhaust gas emitted from the vessel engine, and the $CO_2$ removing unit may remove $CO_2$ by reacting the exhaust gas, from which the $NO_x$ has been removed and which is cooled by the exhaust gas cooling unit, with the absorbent liquid supplied from the absorbent liquid producing unit to convert $CO_2$ into the aqueous ammonium salt solution.

In addition, the absorbent liquid recycling unit may recycle $NH_3$ and return the $NH_3$ back to the absorption tower for reuse as the absorbent liquid, and the $NO_x$ absorbing unit may absorb $NO_x$ with the $NH_3$ supplied from the absorbent liquid recycling unit, or may absorb $NO_x$ using urea water.

In addition, the absorbent liquid producing unit may include: a fresh water tank that stores fresh water; a fresh water control valve that controls an amount of the fresh water supplied from the fresh water tank; a $NH_3$ storage that stores high-pressure $NH_3$; an ammonia water tank that produces and stores high-concentration ammonia water, which is the absorbent liquid, by spraying the $NH_3$ supplied from the $NH_3$ storage to the fresh water supplied by the fresh water control valve; a pH sensor that measures a concentration of the ammonia water in the ammonia water tank; and an ammonia water supply pump that supplies the ammonia water from the ammonia water tank to the secondary absorbent liquid storage tank.

In addition, the apparatus may further include an ammonia water circulation pump that circulates the ammonia water from the secondary absorbent liquid storage tank to the absorption tower.

In addition, the $CO_2$ removing unit may include: an ammonia water spray nozzle that sprays the absorbent liquid supplied from the absorbent liquid recycling unit downward; a packing material that contacts the $CO_2$ with the ammonia water, which is the absorbent liquid, to convert the $CO_2$ into $NH_4HCO_3$(aq); a cooling jacket that is formed in multi-stages for each section of an absorption apparatus filled with the packing material and cools heat generated by a $CO_2$ absorption reaction; a water spray that collects $NH_3$ discharged to the outside without reacting with $CO_2$; a mist removal plate that is formed in a curved multi-plate shape and returns the ammonia water toward the packing material; a partition wall that is formed so that the ammonia water does not leak out; and an umbrella-shaped blocking plate that covers an exhaust gas inlet hole surrounded by the partition wall.

In addition, the packing material may include multi-stage distilling column packings designed to increase a contact area per unit volume, and a solution redistributor is formed between the multi-stage distilling column packings.

In addition, the absorption tower may further include an exhaust gas economizer (EGE) that is formed between the $NO_x$ absorbing unit and the exhaust gas cooling unit and performs heat exchange between waste heat of the exhaust gas from the vessel engine and boiler water.

On the other hand, the present invention may provide a vessel including the above-described apparatus.

Advantageous Effects

According to the present invention, an absorbent liquid recycling unit is provided in two or more stages so that an unreacted aqueous ammonium salt solution remaining in ammonia water is removed to maintain a concentration of ammonia water at a certain level, thereby increasing a recovery rate of an absorbent liquid and preventing the deterioration in greenhouse gas absorption performance.

In addition, a pressurization system may be applied to prevent the loss of absorbent liquid due to the natural evaporation of high-concentration absorbent liquid.

Furthermore, in order to satisfy the IMO greenhouse gas emission regulations, greenhouse gas may be converted into materials that do not affect environments and then separately discharged or may be converted into useful materials and then stored. $NH_3$ may be recycled to minimize consumption of relatively expensive $NH_3$. A capacity size of a rear end of a filter may be reduced. Greenhouse gas may be stored in the form of carbonate that exists in a natural state so that greenhouse gas may be discharged to the sea. Side reactions caused by $SO_x$ remaining during $NH_3$ recycling may be removed, thereby minimizing the loss of $NH_3$ and preventing impurities from being included when recovering ammonia.

In addition, according to the present invention, exhaust gas may be cooled by a heat exchange method, thereby preventing a decrease in a concentration of an absorbent liquid and preventing a deterioration in greenhouse gas absorption performance.

In addition, according to the present invention, exhaust gas may be cooled by a heat exchange method, thereby preventing a decrease in a concentration of an absorbent liquid and preventing a deterioration in greenhouse gas absorption performance.

Furthermore, in order to satisfy the IMO greenhouse gas emission regulations, greenhouse gas may be converted into materials that do not affect environments and then separately discharged or may be converted into useful materials and then stored. $NH_3$ may be recycled to minimize consumption of relatively expensive $NH_3$. A capacity size of a rear end of a filter may be reduced. Greenhouse gas may be stored in the form of carbonate that exists in a natural state so that greenhouse gas may be discharged to the sea. Side reactions caused by $SO_x$ remaining during $NH_3$ recycling may be removed, thereby minimizing the loss of $NH_3$ and preventing impurities from being included when recovering ammonia.

DESCRIPTION OF DRAWINGS

FIG. 7 separately illustrates a steam generating unit and a discharge unit of the apparatus for reducing greenhouse gas emission in a vessel, illustrated in FIG. 2.

FIG. 10 is a schematic configuration diagram of an apparatus for reducing greenhouse gas emission in a vessel, according to another embodiment of the present invention.

BEST MODE

Hereinafter, embodiments of the present invention will be described in detail with reference to the accompanying drawings so that the present invention can be easily carried out by those of ordinary skill in the art. The present invention may be embodied in many different forms and is not limited to embodiments of the present invention described herein.

Figure 1:
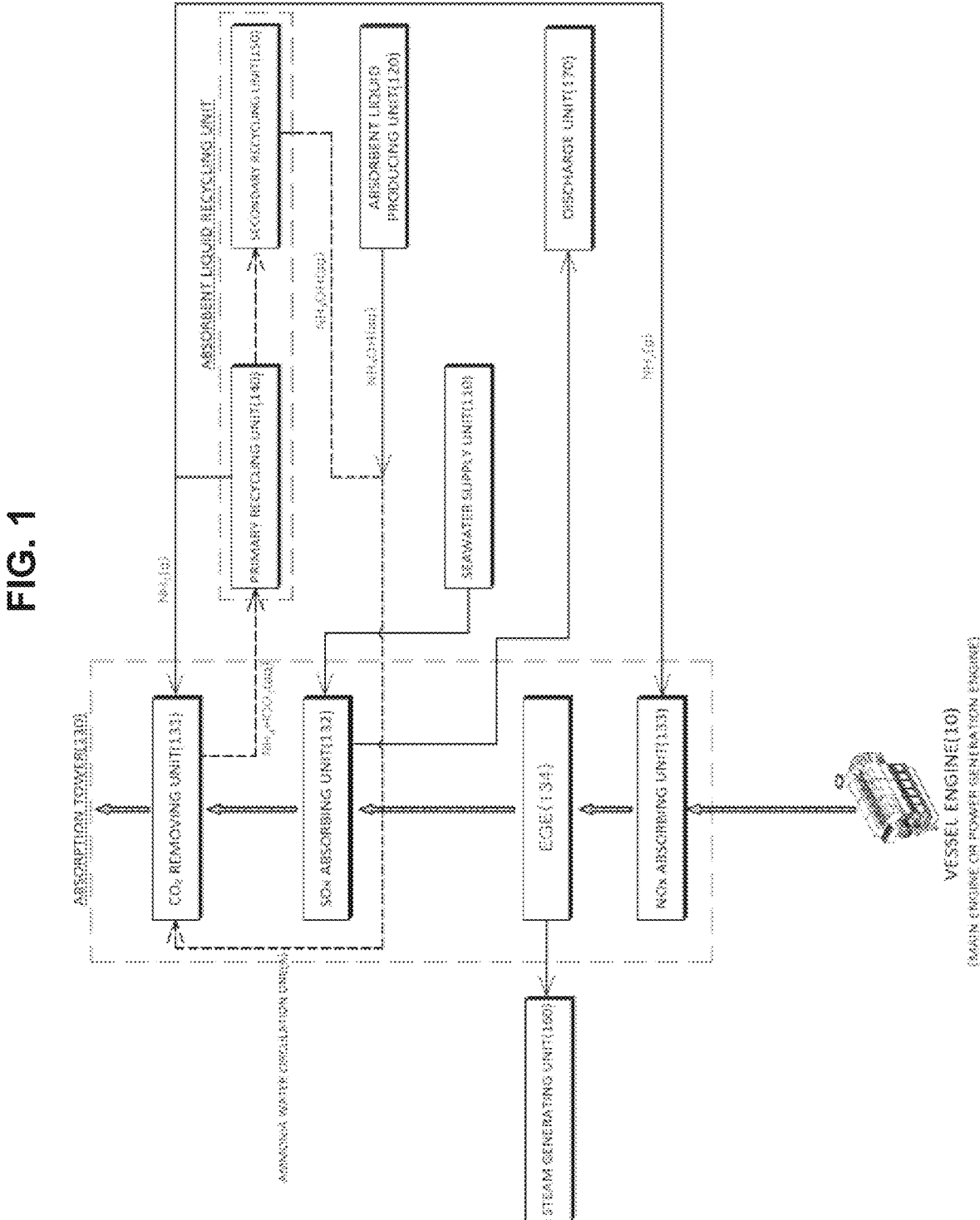
FIG. 1 is a schematic configuration diagram of an apparatus for reducing greenhouse gas emission in a vessel, according to an embodiment of the present invention.

Referring to FIG. 1, an apparatus for reducing greenhouse gas emission in a vessel according to an embodiment of the present invention includes: a seawater supply unit 110 that supplies seawater; an absorbent liquid producing unit 120 that produces and supplies a high-concentration $CO_2$ absorbent liquid; an absorption tower 130 including a $CO_2$ removing unit 131 that cools exhaust gas discharged from a vessel engine 10 by reacting the exhaust gas with the seawater supplied from the seawater supply unit 110, and removes $CO_2$ by reacting the cooled exhaust gas with the absorbent liquid supplied from the absorbent liquid producing unit 120 to convert $CO_2$ into an aqueous ammonium salt solution; and an absorbent liquid recycling unit including a primary recycling unit 140 that primarily recycles the absorbent liquid by reacting the aqueous ammonium salt solution discharged from the absorption tower 130 with an aqueous divalent metal hydroxide solution, and a secondary recycling unit 150 that secondarily recycles the high-concentration absorbent liquid by additionally reacting the aqueous divalent metal hydroxide solution with an unreacted aqueous ammonium salt solution supplied from the primary recycling unit 140 and circulates and supplies the recycled absorbent liquid to the absorption tower 130 for reuse as the absorbent liquid. A recovery rate of the absorbent liquid is increased and maintained at a certain concentration, thereby preventing a deterioration in absorption performance.

Here, according to the type and specification of the vessel engine (low-pressure engine or high-pressure engine) used in a main engine or power generation engine and the type of fuel supplied to the vessel engine (HFO, MDO, LNG, MGO, LSMGO, ammonia, etc.), the absorption tower may optionally include, in addition to the $CO_2$ removing unit, a $NO_x$ absorbing unit or a $SO_x$ absorbing unit, or may include both the $NO_x$ absorbing unit and the $SO_x$ absorbing unit.

In particular, when low sulphur marine gas oil (LSMGO) is used as the fuel of the vessel engine, a $SO_x$ absorbing unit capable of simultaneously performing cooling of exhaust gas and absorption and removal by dissolution of $SO_x$ may be additionally provided.

Hereinafter, an embodiment in which the $NO_x$ absorbing unit, the $SO_x$ absorbing unit, and the $CO_2$ removing unit are sequentially stacked on the absorption tower will be described, but the present invention is not limited thereto. As described above, the $NO_x$ absorbing unit and/or the $SO_x$ absorbing unit may or may not be included according to the types of vessel engine and fuel.

Hereinafter, the apparatus for reducing greenhouse gas emission in the vessel will be described in detail with reference to FIGS. 1 to 9.

First, a seawater supply unit 110 supplies seawater to an absorption tower 130 so that temperature of exhaust gas is lowered to facilitate absorption of $CO_2$ by an absorbent liquid.

Figure 2:
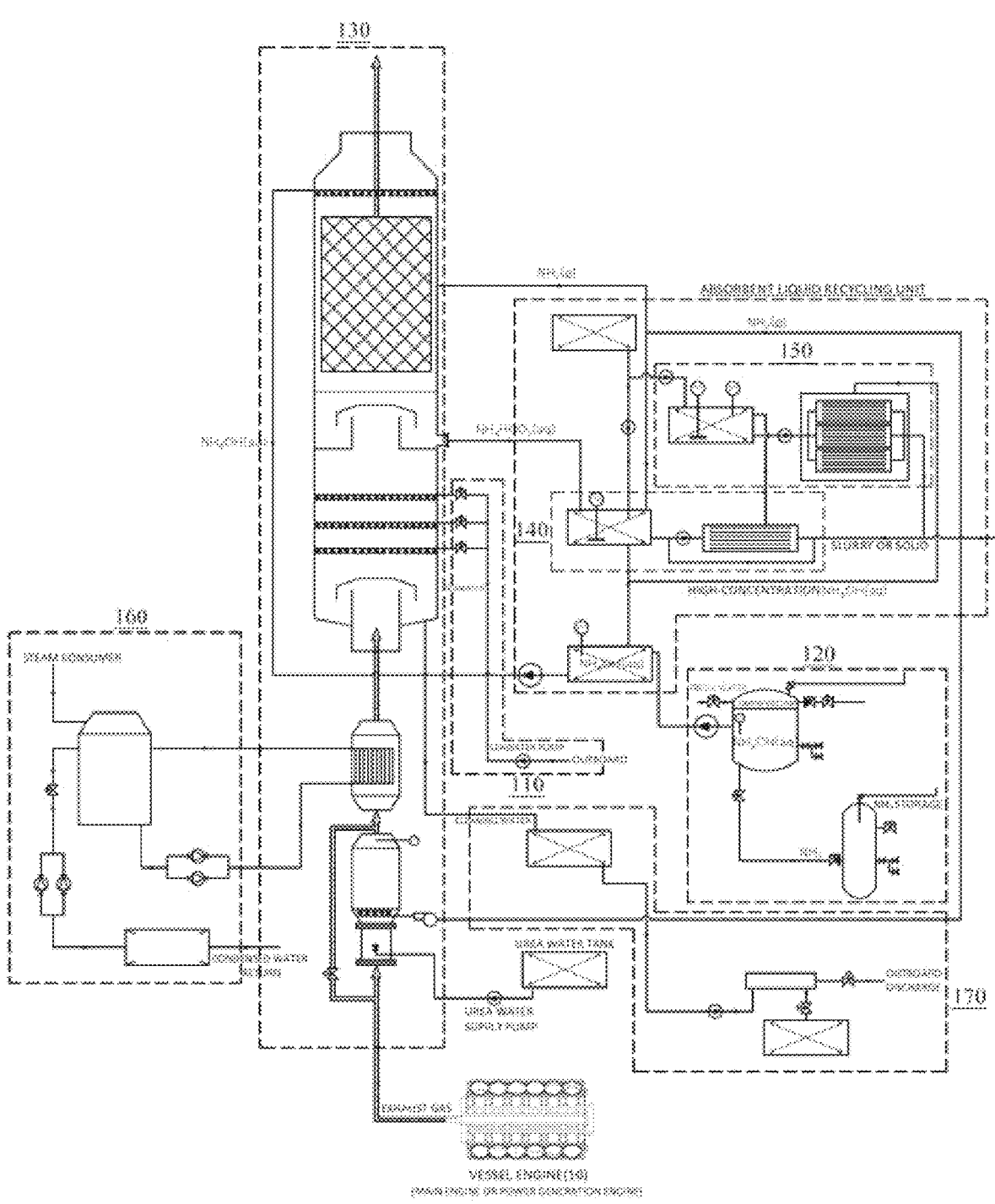
FIG. 2 is a circuit diagram of a system implementing the apparatus for reducing greenhouse gas emission in a vessel, illustrated in FIG. 1.
Figure 3:
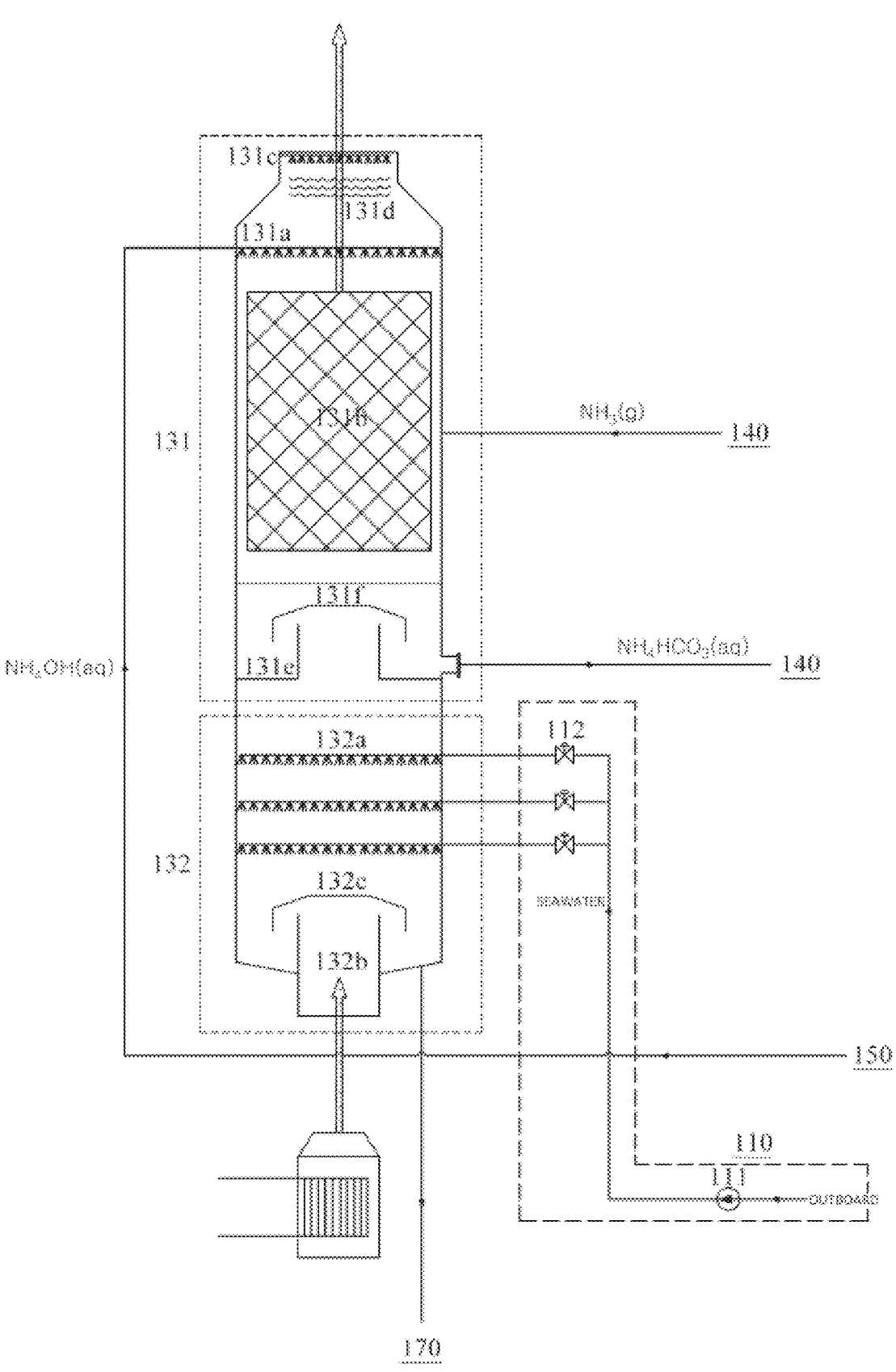
FIG. 3 separately illustrates a seawater supply unit of the apparatus for reducing greenhouse gas emission in a vessel, illustrated in FIG. 2.

Specifically, as illustrated in FIGS. 2 and 3, the seawater supply unit 110 may include: a seawater pump 111 that suctions seawater from the outside of the vessel through a sea chest (not illustrated) and pumps the seawater to a $SO_x$ absorbing unit 132 of the absorption tower 130; and a seawater control valve 112 that controls the spray amount of the seawater supplied to the $SO_x$ absorbing unit 132 according to the amount of exhaust gas. Here, the seawater pump 111 may separately include a suction pump that suctions the seawater from the outside of the vessel and a seawater transfer pump that pumps and transfers the seawater to the $SO_x$ absorbing unit 132.

For reference, when the vessel is berthing or sailing, seawater may be selectively supplied to the seawater pump 111 from a high sea chest that suctions upper seawater or a low sea chest that suctions lower seawater according to the depth of water. That is, when the vessel is berthing, the high sea chest may be used because the upper seawater is cleaner than the lower seawater, and when the vessel is sailing, the low sea chest may be used because the lower seawater is cleaner than the upper seawater.

Here, the seawater control valve 112 may be a manually operated diaphragm valve or a solenoid type valve that controls the flow rate of seawater, but the present invention is not limited thereto. Any type of valve may be applied as long as the amount of seawater sprayed through a seawater spray nozzle 132*a* can be controlled according to the amount of exhaust gas.

Next, the absorbent liquid producing unit 120 reacts fresh water with $NH_3$ as shown in [Chemical Formula 1] below to produce high-concentration ammonia water ($NH_4OH$(aq)), which is a high-concentration $CO_2$ absorbent liquid, and supplies the high-concentration ammonia water ($NH_4OH$ (aq)) to the absorption tower 130 through an absorbent liquid storage tank 153.

$$NH_3 + H_2 \rightarrow NH_4OH(aq), \text{ (exothermic reaction 1650 MJ/ton)} \qquad \text{[Chemical Formula 1]}$$

Figure 4:
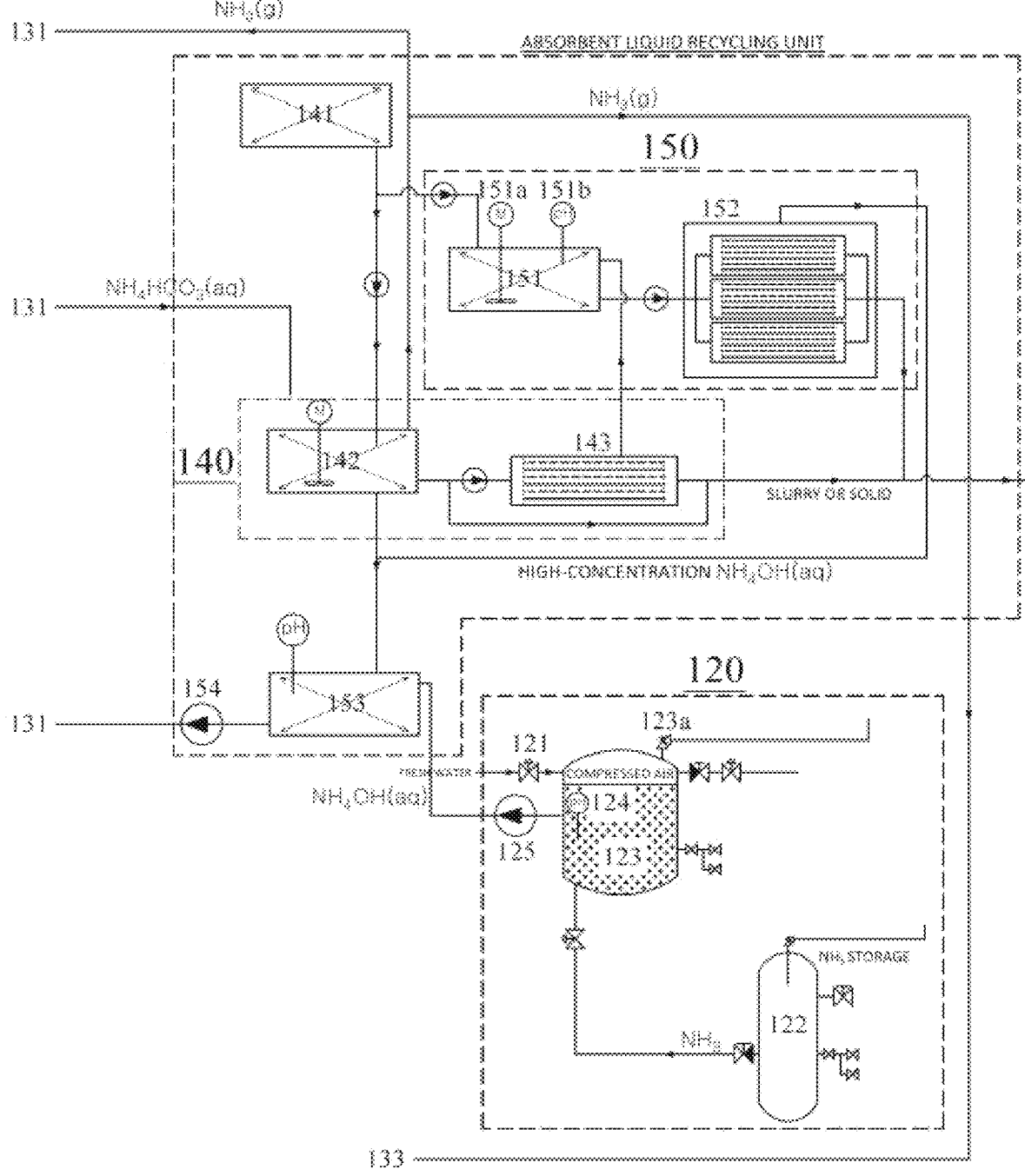
FIG. 4 separately illustrates an absorbent liquid producing unit and an absorbent liquid recycling unit of the apparatus for reducing greenhouse gas emission in a vessel, illustrated in FIG. 2.

Specifically, as illustrated in FIGS. 2 and 4, the absorbent liquid producing unit 120 may include: a fresh water tank (not illustrated) that stores fresh water; a fresh water control valve 121 that supplies the fresh water from the fresh water tank to an ammonia water tank 123; a $NH_3$ storage 122 that stores high-pressure $NH_3$; an ammonia water tank 123 that produces and stores high-concentration ammonia water by spraying $NH_3$ supplied from the $NH_3$ storage 122 to the fresh water supplied by the fresh water control valve 121; a pH sensor 124 that measures a concentration of the ammonia water in the ammonia water tank 123; and an ammonia water supply pump 125 that supplies the high-concentration ammonia water from the ammonia water tank 123 to a secondary absorbent liquid storage tank 153.

The concentration of the ammonia water circulating through the absorption tower 130 and an absorbent liquid recycling unit changes as the operation is repeated. For example, the concentration of the ammonia water is reduced when $NH_3$ is supplied to the $NO_x$ absorbing unit 133 and used to absorb and remove $NO_x$, or when $NH_3$ passes through the absorption tower 130 and is exhausted together with the exhaust gas. When the concentration of the ammonia water is reduced, the absorbent liquid producing unit 120 supplies the high-concentration ammonia water to an absorbent liquid circulation line (see A in FIG. 1) to compensate for the reduced concentration of the ammonia water so that the ammonia water is constantly maintained at a designed concentration.

On the other hand, since the high-concentration ammonia water has a higher partial pressure of $NH_3(g)$ than that of the low-concentration ammonia water at the same temperature, $NH_3$ is relatively more evaporated in an atmospheric pressure state, resulting in an increase in loss. Therefore, in order to store the high-concentration ammonia water, it is necessary to lower temperature in order for increasing the solubility and reducing the vapor pressure of $NH_3(g)$ and to operate under a pressurization system.

That is, in order to prevent a phenomenon that $NH_3(g)$ is evaporated and lost to the atmosphere, compressed air of a constant pressure may be injected into the ammonia water tank 123 so that the pressure in the ammonia water tank 123 is maintained to be high, thereby preventing the evaporation loss of $NH_3$.

For example, since $NH_3$ may be stored in a liquid state at $-34°$ C. and 8.5 bar, 50% concentration of ammonia water may be stored in the ammonia water tank 123 by maintaining the inside of the ammonia water tank 123 at a constant pressure by using compressed air of 7 bar available in the vessel.

In addition, a safety valve 123a for preventing overpressure of the ammonia water tank 123 may be installed.

Next, the absorption tower 130 includes a $CO_2$ removing unit 131 that cools exhaust gas discharged from the vessel engine 10 by reacting the exhaust gas with the seawater supplied from the seawater supply unit 110, reacts $CO_2$ of the cooled exhaust gas with ammonia water, which is the absorbent liquid supplied from the absorbent liquid producing unit 120, and converts $CO_2$ into an aqueous ammonium salt solution ($NH_4HCO_3(aq)$) to remove $CO_2$ as shown in [Chemical Formula 2] below.

$$2NH_4OH+CO_2 \rightarrow (NH_4)_2CO_3+H_2O$$

$$(NH_4)_2CO_3+CO_2+H_2O \rightarrow 2NH_4HCO_3 \qquad \text{[Chemical Formula 2]}$$

Specifically, as illustrated in FIG. 3, the $CO_2$ removing unit 131 may include: an ammonia water spray nozzle 131a that sprays the ammonia water supplied from the secondary absorbent liquid storage tank 153 downward; a packing material 131b that contacts $CO_2$ of the exhaust gas with the ammonia water, which is the absorbent liquid, and converts $CO_2$ into $NH_4HCO_3(aq)$; a cooling jacket (not illustrated) that is formed in multi-stages for each section of an absorption apparatus filled with the packing material 131b and cools heat generated by the $CO_2$ absorption reaction; a water spray 131c that collects $NH_3$ discharged to the outside without reacting with $CO_2$; a mist removal plate 131d that is formed in a curved multi-plate shape and returns the ammonia water scattered when sprayed by the ammonia water spray nozzle 131a toward the packing material 131b; a partition wall 131e that is formed so that the ammonia water passing through the packing material 131b does not flow back to the $SO_x$ absorbing unit 132, and an umbrella-shaped blocking plate 131f that covers an exhaust gas inlet hole surrounded by the partition wall 131e.

Here, the cooling jacket may cool heat to $30°$ C. to $50°$ C. at which the material transfer is smoothest, so that $NH_3$ is not evaporated and lost while maintaining a $CO_2$ absorption rate at a certain level.

Figure 8:
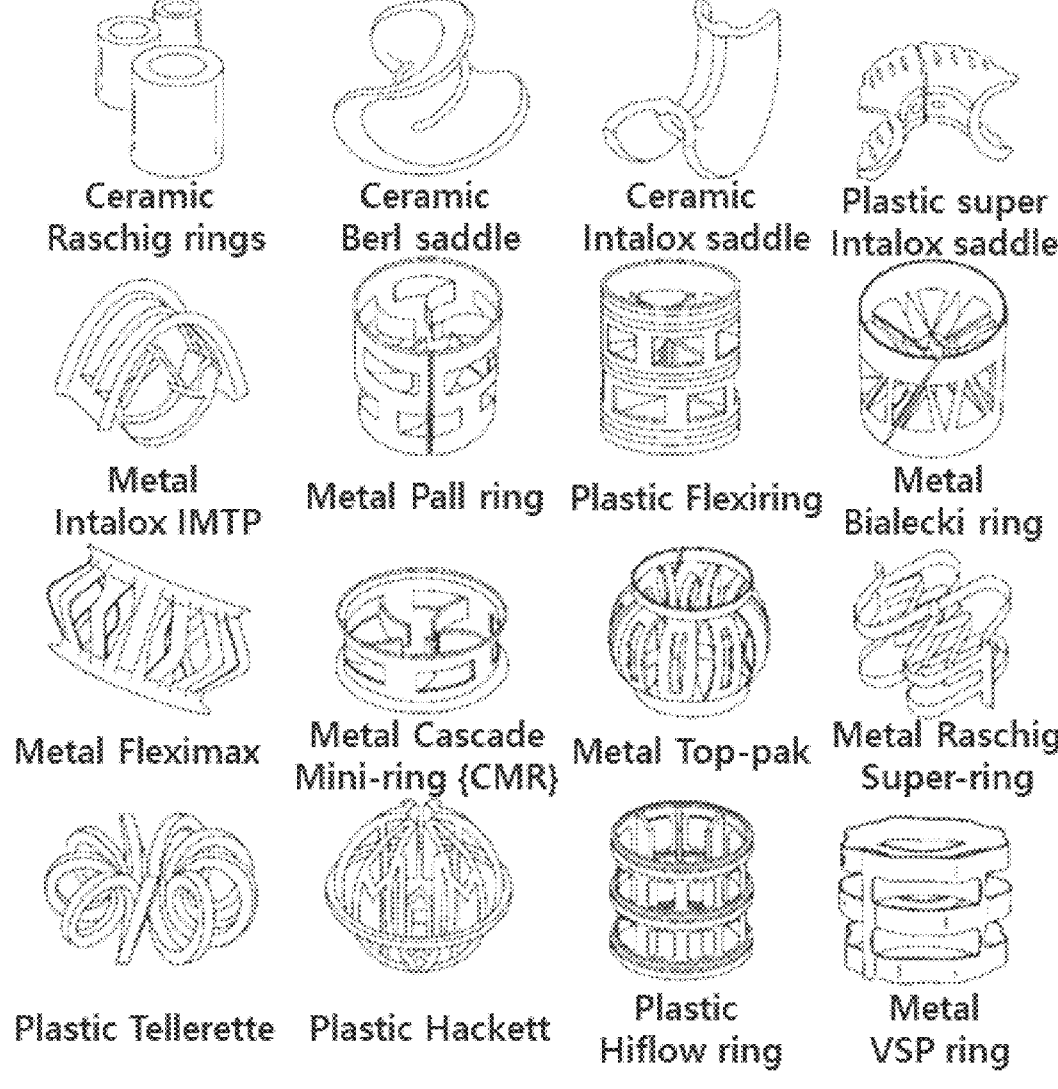
FIG. 8 illustrates various packing materials applied to the apparatus for reducing greenhouse gas emission in a vessel, illustrated in FIG. 2.
Figure 9:
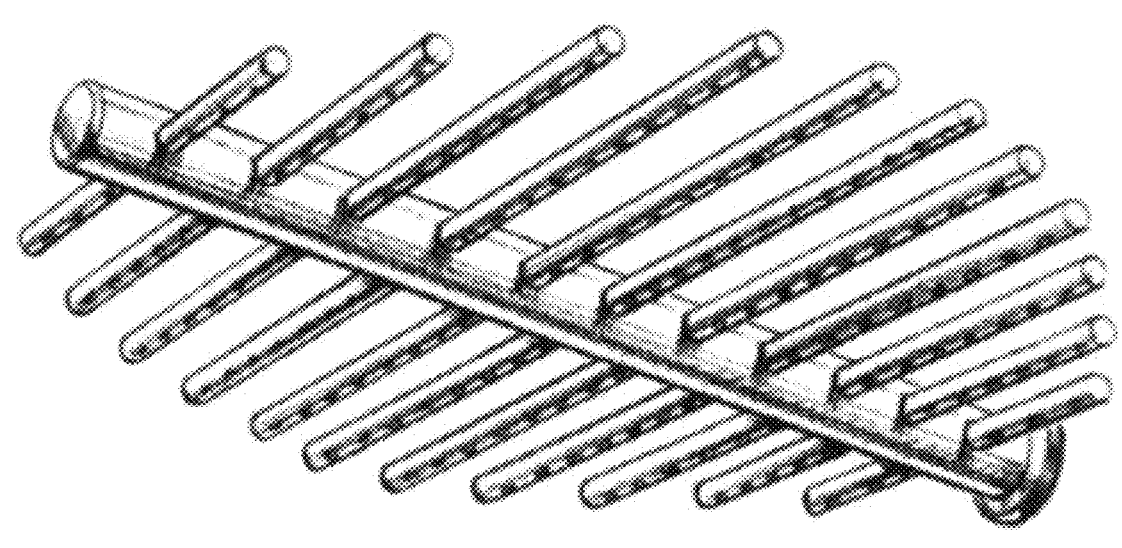
FIG. 9 illustrates an ammonia water spray nozzle applied to the apparatus for reducing greenhouse gas emission in a vessel, illustrated in FIG. 2.
Figure 9:
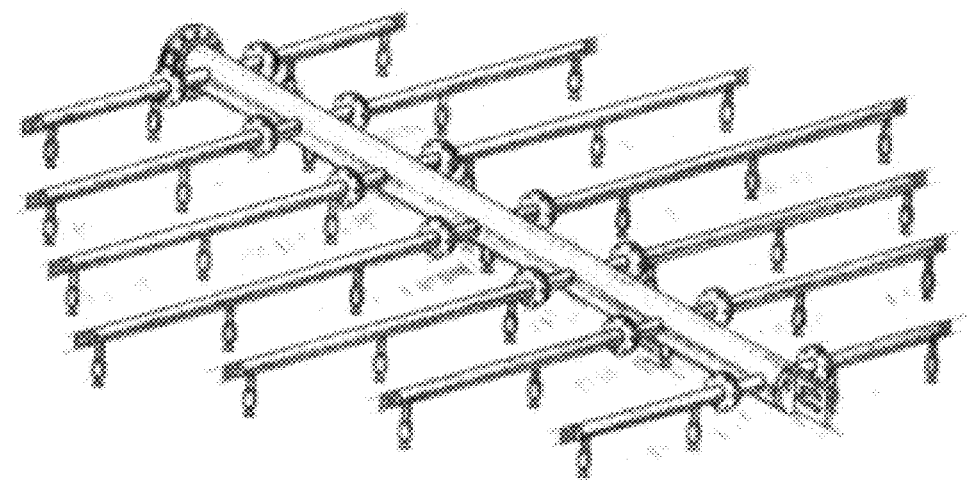

On the other hand, the $CO_2$ removing unit 131 may be considered in various forms so as to operate within an allowable pressure drop of an exhaust pipe required by an engine specification while increasing a contact area between the exhaust gas and $NH_3$. For example, the packing material 131b may include multi-stage distilling column packings designed to increase a contact area per unit volume. As illustrated in FIG. 8, a distilling column packing suitable for an absorption process may be selected considering the contact area per unit area, the pressure drop of gas, and the flooding velocity. As illustrated in FIG. 9, the ammonia water spray nozzle 131a may be provided in a ladder pipe form FIG. 9A or a spray form FIG. 9B.

In addition, a solution redistributor (not illustrated) may be formed between the distilling column packings so as to prevent channeling when the ammonia water passes downward through the packing material 131b, the exhaust gas passes upward through the packing material 131b, and the ammonia water and the exhaust gas contact each other.

In addition, the mist removal plate 131d allows the scattered ammonia water to adhere to the curved multi-plate, so that droplets become large, and drains the ammonia water toward the packing material 131b by the own weight thereof.

On the other hand, when the vessel engine 10 uses LNG as fuel, $SO_x$ may not be generated, but when the vessel engine 10 uses LSMGO as fuel, the absorption tower 130 may further include the $SO_x$ absorbing unit 132.

That is, the $SO_x$ absorbing unit 132 may dissolve and remove $SO_x$ while cooling the exhaust gas discharged from the vessel engine 10 by reacting the exhaust gas with the seawater supplied from the seawater supply unit 110, and the $CO_2$ removing unit 131 may cool the exhaust gas, from which the $SO_x$ is removed, through reaction with the seawater supplied from the seawater supply unit 110, react the cooled exhaust gas with the absorbent liquid supplied from the absorbent liquid producing unit 120 to convert $CO_2$ into an aqueous ammonium salt solution, and absorb and remove $CO_2$.

Figure 6:
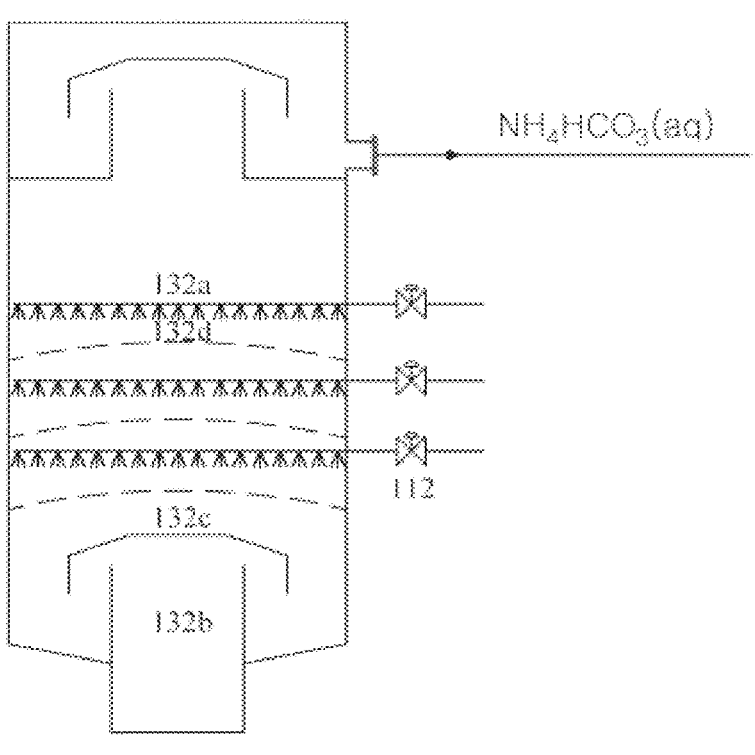
FIG. 6 separately illustrates a $SO_x$ absorbing unit of the absorption tower of FIG. 5.
Figure 6:
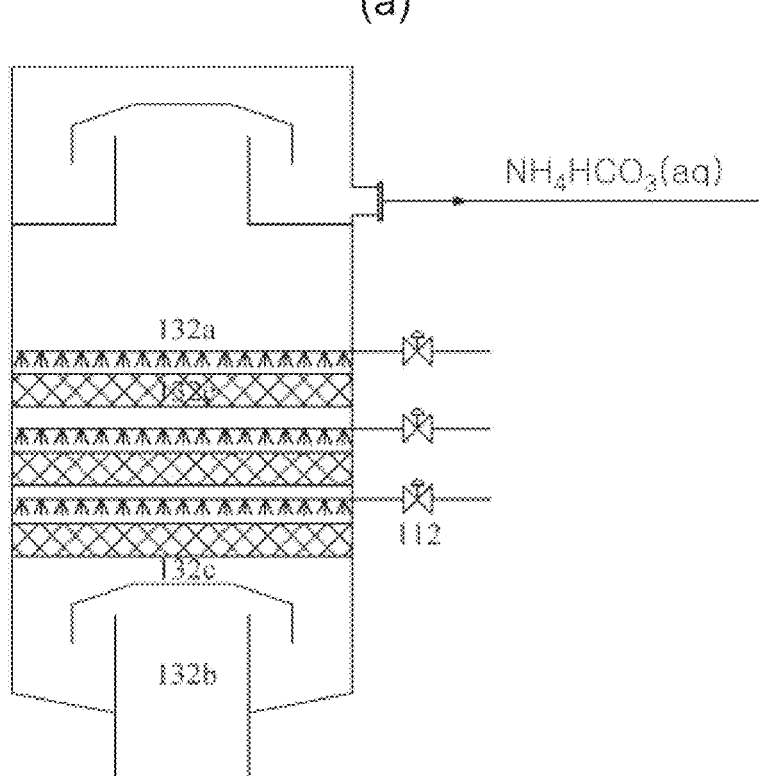

Specifically, the $SO_x$ absorbing unit 132 is a section that is in primary contact with seawater. As illustrated in FIGS. 3 and 6, the $SO_x$ absorbing unit 132 may include: a multi-stage seawater spray nozzle 132a that dissolves $SO_x$ by spraying the seawater supplied from the seawater supply unit 110 downward and removes dusts such as soot; and a partition wall-shaped exhaust gas inlet pipe 132b that prevents cleaning water from flowing back, or an umbrella-shaped blocking plate 132c that covers the exhaust gas inlet pipe 132b.

On the other hand, the $SO_x$ absorbing unit 132 may cool the temperature of the exhaust gas to $27°$ C. to $33°$ C., preferably about $30°$ C., which is required by the $CO_2$ removing unit 131, through the seawater spray nozzle 132a or a separate cooling jacket (not illustrated). As illustrated in FIG. 6A, porous upper plates 132d having a passage through which the exhaust gas passes may be respectively formed in multi-stages under the seawater spray nozzle 132a, so that the seawater and the exhaust gas come into smooth contact with each other. As illustrated in FIG. 6B, an absorption apparatus 132e filled with a packing material for allowing the seawater and the exhaust gas to come into contact with each other may be formed under the seawater spray nozzle 132a, so that the seawater dissolves $SO_x$.

On the other hand, a closed loop system may be applied to add a compound forming alkali ions, for example, a basic chemical of $NaOH$ or $MgO$, to the seawater supplied to the $SO_x$ absorbing unit 132 in order to further increase the solubility of $SO_x$.

For reference, the closed loop system involves additional consumption of basic chemicals, but has an advantage that the amount of circulating seawater is small, and the open loop system that discharges $SO_x$ dissolved by spraying only seawater to the outside of the vessel has no additional consumption of basic chemicals and is simple. In order to maximize these advantages, a hybrid system in which the open loop system and the closed loop system are combined may be applied.

In this regard, by removing $SO_x$ through the $SO_x$ absorbing unit 132 and then removing $CO_2$ through the $CO_2$ removing unit 131, it is possible to solve the problem that it is difficult to remove $CO_2$ until $SO_x$ is completely dissolved because the solubility of $SO_x$ is high and thus $SO_x$ is first changed to a compound such as $NaSO_3$, thereby improving the solubility of $CO_2$ and the removal efficiency of $CO_2$.

Here, cleaning water drained to a discharge unit 170 after $SO_x$ is absorbed by the $SO_x$ absorbing unit 132 contains $SO_3^-$, $SO_4^{2-}$, soot, $NaSO_3$, $Na_2SO_4$, $MgCO_3$, $MgSO_4$, and other ionic compounds together.

On the other hand, as described above, the absorption tower 130 may further include a $NO_x$ absorbing unit 133 that absorbs and removes $NO_x$ from the exhaust gas discharged from the vessel engine 10. The absorption tower 130 may cool the exhaust gas, from which the $NO_x$ has been removed, through reaction with the seawater supplied from the seawater supply unit 110 and may remove $CO_2$ by reacting the cooled exhaust gas with the absorbent liquid supplied from the absorbent liquid producing unit 120 to convert $CO_2$ into an aqueous ammonium salt solution.

That is, in the absorption tower 130, the $NO_x$ absorbing unit 133 that absorbs and removes $NO_x$ from the exhaust gas discharged from the vessel engine 10, the $SO_x$ absorbing unit 132 that dissolves and removes $SO_x$ while cooling the exhaust gas, from which the $NO_x$ has been removed, through reaction with the seawater, and the $CO_2$ removing unit 131 that removes $CO_2$ by reacting the exhaust gas, from which the $SO_x$ has been removed, with the ammonia water supplied from the absorbent liquid producing unit 120 to convert $CO_2$ into $NH_4HCO_3(aq)$ are stacked in the vertical direction to sequentially absorb and remove the $NO_x$, the $SO_x$, and the $CO_2$.

Therefore, since the $CO_2$ removing unit 131 removes $NO_x$ and $SO_x$ by reacting the ammonia water with the exhaust gas from which the $NO_x$ and the $SO_x$ have been removed, side reactions caused by $NO_x$ and $SO_x$ do not occur during the $CO_2$ removal process, thereby minimizing the generation of impurities and obtaining $NH_4HCO_3$ with less impurities in a subsequent process.

Here, the absorption tower 130 may include the $CO_2$ removing unit 131, the $SO_x$ absorbing unit 132, the $NO_x$ absorbing unit 133, and an exhaust gas economizer (EGE) 134 to be described later, may be modularized and combined with individual modules, and may be integrated in a single tower form, and the absorption tower 130 itself may include a single tower or a group of a plurality of towers.

Figure 5:
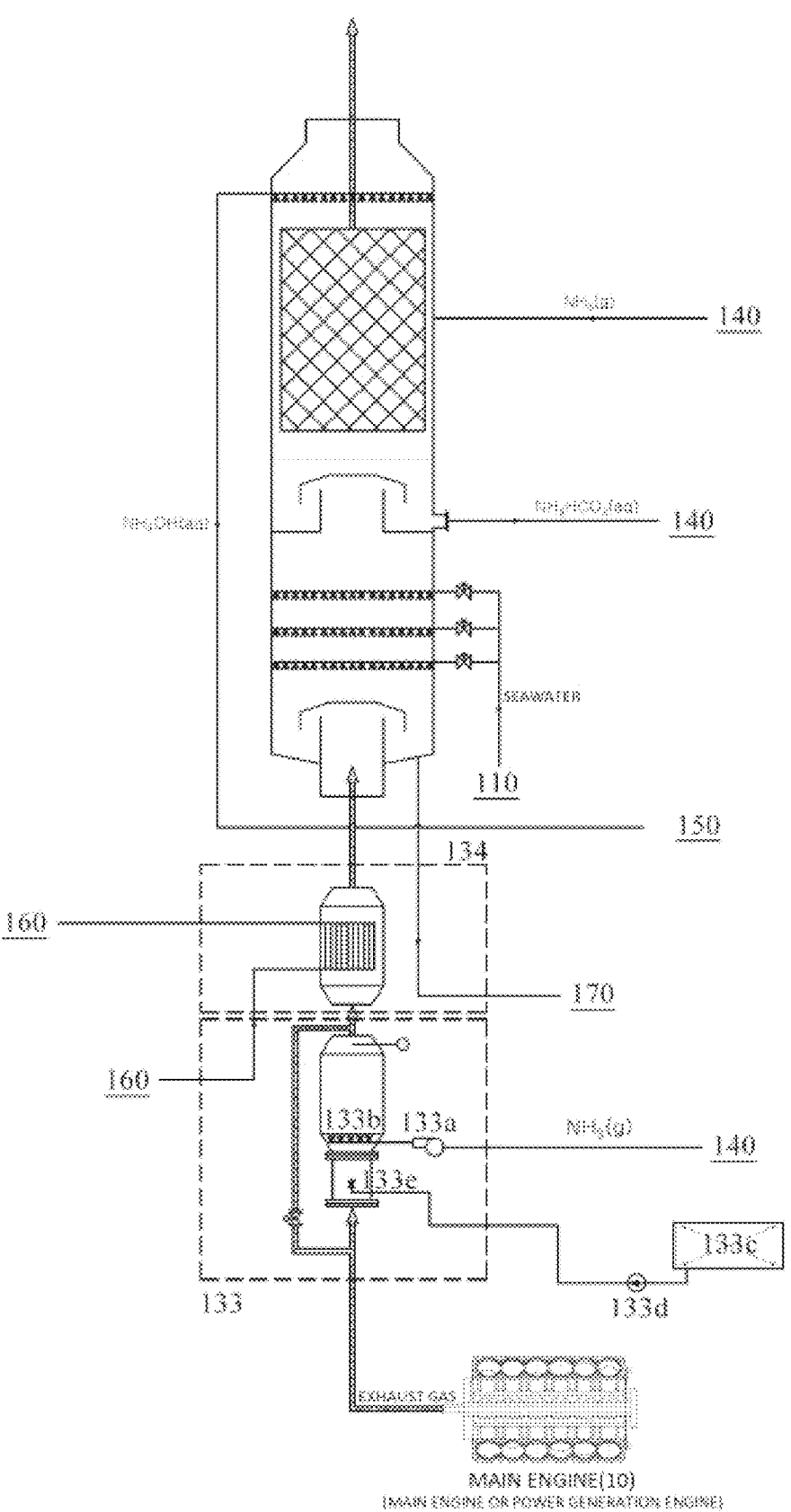
FIG. 5 separately illustrates an absorption tower of the apparatus for reducing greenhouse gas emission in a vessel, illustrated in FIG. 2.

Specifically, the $NO_x$ absorbing unit 133 is a selective catalyst reactor (SCR). As illustrated in FIG. 5, the $NO_x$ absorbing unit 133 may directly supply $NH_3$ from a primary recycling unit 140 to a first $NH_3$ spray nozzle 133b through a blower 133a or a compressor, or when $NH_3$ is insufficient, may receive urea water of a urea water storage tank 133c from a second $NH_3$ spray nozzle 133e through a urea water supply pump 133d so as to compensate for the lack of $NH_3$.

On the other hand, since $NH_3$ and $CO_2$ are generated when the urea water is decomposed, it may be preferable that $NH_3$ is directly supplied to reduce the amount of $CO_2$ generated.

In addition, the absorption tower 130 may further include an EGE 134 that is formed between the $NO_x$ absorbing unit 133 and the $SO_x$ absorbing unit 132 and performs heat exchange between waste heat of the vessel engine 10 and boiler water.

Next, the absorbent liquid recycling unit may recycle $NH_3$ and return $NH_3$ back to the absorption tower 130 for reuse as a $CO_2$ absorbent liquid, may store $CO_2$ in the form of $CaCO_3(s)$ or $MgCO_3(s)$ or discharge $CO_2$ to the outside of the vessel, or may supply $NH_3$ to the $NO_x$ absorbing unit 133 so as to absorb $NO_x$ with $NH_3$.

That is, the absorbent liquid recycling unit may include: a primary recycling unit 140 that primarily recycles the absorbent liquid by reacting the aqueous ammonium salt solution discharged from the absorption tower 130 with an aqueous divalent metal hydroxide solution; and a secondary recycling unit 150 that secondarily recycles the high-concentration absorbent liquid by reacting the aqueous divalent metal hydroxide solution with an unreacted aqueous ammonium salt solution supplied from the primary recycling unit 140 and circulates and supplies the recycled absorbent liquid to the absorption tower 130 for reuse as the absorbent liquid. A recovery rate of the absorbent liquid may be increased and maintained at a certain concentration. As described above, $NH_3$ is supplied to the $NO_x$ absorbing unit 133 and used to absorb and remove $NO_x$. $NH_3$ is discharged together with exhaust gas through the absorption tower 130, so that the concentration of the ammonia water is lowered. Therefore, it is possible to effectively prevent the deterioration in absorption performance.

Specifically, as illustrated in FIG. 4, the absorbent liquid recycling unit may include: a storage tank 141 that stores an aqueous divalent metal hydroxide solution; a primary recycling unit 140 including a mixing tank 142 in which the aqueous divalent metal hydroxide solution and the aqueous ammonium salt solution discharged from the absorption tower 130 are stirred by an agitator to generate $NH_3(g)$ and carbonate as shown in [Chemical Formula 3] below, and a primary filter 143 that suctions a solution and precipitate from the mixing tank 142 and separates the carbonate and ammonia water (or fresh water); and a secondary recycling unit 150 including a primary absorbent liquid storage tank 151 that stores an unreacted aqueous ammonium salt solution remaining without reacting with the ammonia water and the aqueous divalent metal hydroxide separated by the primary filter 143 and re-reacting the unreacted aqueous ammonium salt solution with the aqueous divalent metal hydroxide solution supplied from the storage tank 141, a secondary filter 152 that suctions the solution and precipitate from the primary absorbent liquid storage tank 151 to separate carbonate and high-concentration ammonia water and is designed corresponding to the capacity of the primary absorbent liquid storage tank 151, a secondary absorbent liquid storage tank 153 that stores the high-concentration ammonia water separated by the secondary filter 152, and an ammonia water circulation pump 154 that pumps and circulates the ammonia water from the secondary absorbent liquid storage tank 153 to the $CO_2$ removing unit 131.

$$NH_4HCO_3+Ca(OH)_2 \leftrightarrow CaCO_3(s)+2H_2O+NH_3(g)$$

$$NH_4HCO_3+Mg(OH)_2 \leftrightarrow MgCO_2(s)+2H_2O+NH_3(g) \qquad \text{[Chemical Formula 3]}$$

Here, the storage capacity of the primary absorbent liquid storage tank 151 is designed to be at least three times the capacity of the absorbent liquid circulating through the absorption tower 130 and the absorbent liquid recycling unit, and thus has a relatively large capacity compared to the capacity of the circulating absorbent liquid. The stay time of the unreacted aqueous ammonium salt solution in the primary absorbent liquid storage tank 151 is increased to sufficiently secure the reaction time. Therefore, the unre-acted aqueous ammonium salt solution may be converted into carbonate.

Accordingly, the unreacted aqueous ammonium salt solution remaining in the ammonia water may be removed to maintain the concentration of the ammonia water at a certain level.

That is, in the mixing tank 142, the aqueous divalent metal hydroxide solution frequently changes while passing through the filter due to the influence of the reaction rate, the evaporation of ammonia, and the like. When the generation of carbonate is not completed, a considerable amount of the unreacted aqueous ammonium salt solution remains in the ammonia water, resulting in a reduction in the absorption rate. Therefore, by designing a large-capacity primary absor-bent liquid storage tank 151, the recovery rate of the ammonia water is increased by allowing reaction for a sufficient time and passing through the secondary filter 152 again. The concentration of the ammonia water may be maintained at a certain level at which the ammonia water can function as an effective absorbing liquid.

In addition, ammonia gas generated in the mixing tank 142 may be supplied to the $CO_2$ removing unit 131 of the absorption tower 130, or may be supplied to the $NO_x$ absorbing unit 133.

On the other hand, the primary absorbent liquid storage tank 151 may include: an agitator 151a that stirs and reacts the aqueous divalent metal hydroxide solution and the unreacted aqueous ammonium salt solution; and a pH sensor 151b that measures the degree of reaction by the agitator 151a.

In addition, the aqueous divalent metal hydroxide solution stored in the storage tank may be $Ca(OH)_2$ or $Mg(OH)_2$ produced by reacting fresh water with CaO or MgO.

For example, when the concentration of the ammonia water circulating through the ammonia water circulation line A is low, the amount of $(NH_4)_2CO_3$ produced in [Chemical Formula 2] decreases, resulting in an increase in the amount of $CO_2$ emitted. When the concentration of the ammonia water is high, the amount of carbonate produced increases more than necessary due to excessive $CO_2$ absorption. Thus, it is necessary to constantly maintain the concentration of the ammonia water so that the $CO_2$ absorption performance of the absorption tower 130 is kept. In order to achieve this purpose, the concentration of the ammonia water may be designed to be adjusted to 12% by mass, but the present invention is not limited thereto and the concentration of the ammonia water may be changed according to the conditions of use.

In addition, a separate storage tank (not illustrated) that stores carbonate ($CaCO_3(s)$ or $MgCO_3(s)$) separated by the primary filter 143 and the secondary filter 152 in a slurry state or a solid state transferred to a dryer (not illustrated) and solidified may be provided, and carbonate ($CaCO_3(s)$ or $MgCO_3(s)$) may be discharged to the outside of the vessel. Here, as an example of the primary filter 143 and the secondary filter 152, a membrane filter suitable for precipi-tate separation by high-pressure fluid transfer may be applied.

In addition, the ammonia water circulation pump 154 may be provided as a centrifugal pump-type pump so that a large amount of ammonia water circulates through the ammonia water circulation line A.

On the other hand, the fresh water or the ammonia water separated by the primary filter 143 and the secondary filter 152 is supplied to the secondary absorbent liquid storage tank 153, or surplus fresh water additionally generated by the mixing tank 142 relative to the total circulating fresh water is stored in a fresh water tank (not illustrated) and reused when the aqueous divalent metal hydroxide solution is generated in the storage tank 141, thereby saving the fresh water.

In this manner, since only the relatively inexpensive metal oxide (CaO or MgO) or aqueous divalent metal hydroxide solution ($Ca(OH)_2$ or $Mg(OH)_2$) is added, no additional addition of water is required, there is no decrease in the concentration of ammonia water, the capacity sizes of the primary filter 143 and the secondary filter 152 may be reduced, and the $NH_3$ recycling cost may be reduced. That is, in theory, only the metal oxide is consumed and $NH_3$ and fresh water are reused, thereby significantly reducing the $CO_2$ removal cost.

Figure 7:
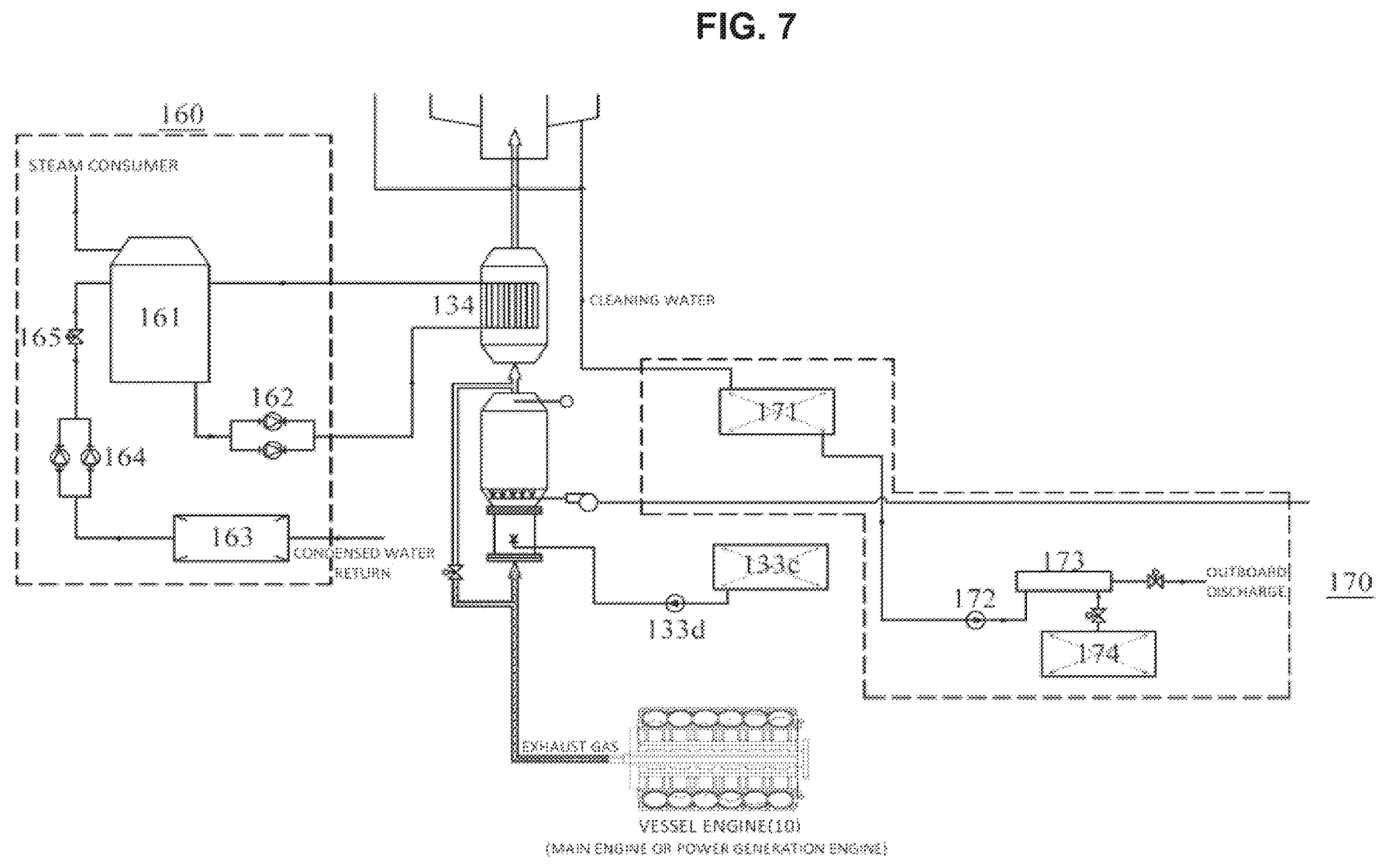

Next, as illustrated in FIG. 7, the steam generating unit 160 may include: an auxiliary boiler 161 that receives a mixture in the form of saturated water and steam heat-exchanged through the EGE 134, separates the steam by a steam drum (not illustrated), and supplies the separated steam to a steam consumer; a boiler water circulation pump 162 that circulates and supplies boiler water from the auxiliary boiler 161 to the EGE 134; a cascade tank 163 that recovers condensed water condensed and phase-changed after being consumed from the steam consumer; and a supply pump 164 and a control valve 165 that supply boiler water from the cascade tank 163 to the auxiliary boiler 161 while controlling the amount of boiler water. The steam generating unit 160 generates and supplies steam required for heating devices in the vessel.

Here, when the load of the vessel engine 10 is large, the amount of heat that may be provided from the exhaust gas is large, and thus the amount of steam required in the vessel may be sufficiently produced through the EGE 134; other-wise, the auxiliary boiler 161 itself may burn fuel to produce necessary steam.

Next, as illustrated in FIG. 7, the discharge unit 170 may include: a cleaning water tank 171 that stores cleaning water discharged from the absorption tower 130; a water treatment device 173 including a filtering unit that controls turbidity to satisfy the outboard discharge condition of the cleaning water transferred from the cleaning water tank 171 by the transfer pump 172, and a neutralizing agent injecting unit that controls pH; and a sludge storage tank 174 that separates and stores solid emissions such as soot. The discharge unit 170 may discharge the cleaning water, which passes through the water treatment device 173 and satisfies the outboard discharge condition, to the outside of the vessel, and may separately store the solid emissions, such as soot, which do not satisfy the outboard discharge conditions, in the sludge storage tank 174.

On the other hand, NaOH may be used as the neutralizing agent for satisfying the outboard discharge condition. How-ever, assuming that the materials discharged from the absorption tower 130 are acidic and basic, a neutralizing agent capable of neutralizing each of the acidic material and the basic material may be selected and used as necessary.

On the other hand, according to another embodiment of the present invention, a vessel including the apparatus for reducing greenhouse gas emission may be provided.

Therefore, the apparatus for reducing greenhouse gas emission in the vessel has the following effects. The absor-bent liquid recycling unit may be provided in two or more stages so that the unreacted aqueous ammonium salt solution remaining in the ammonia water is removed to maintain the concentration of the ammonia water at a certain level, thereby increasing the recovery rate of the absorbent liquid. The deterioration in greenhouse gas absorption performance may be prevented. A pressurization system may be applied to prevent the loss of absorbent liquid due to the natural evaporation of high-concentration absorbent liquid. In order to satisfy the IMO greenhouse gas emission regulations, greenhouse gas may be converted into materials that do not affect environments and then separately discharged or may be converted into useful materials and then stored. $NH_3$ may be recycled to minimize consumption of relatively expensive $NH_3$. A capacity size of a rear end of a filter may be reduced. Greenhouse gas may be stored in the form of carbonate that exists in a natural state so that greenhouse gas may be discharged to the sea. Side reactions caused by $SO_x$ remaining during $NH_3$ recycling may be removed, thereby minimizing the loss of $NH_3$ and preventing impurities from being included when recovering ammonia.

Figure 10:
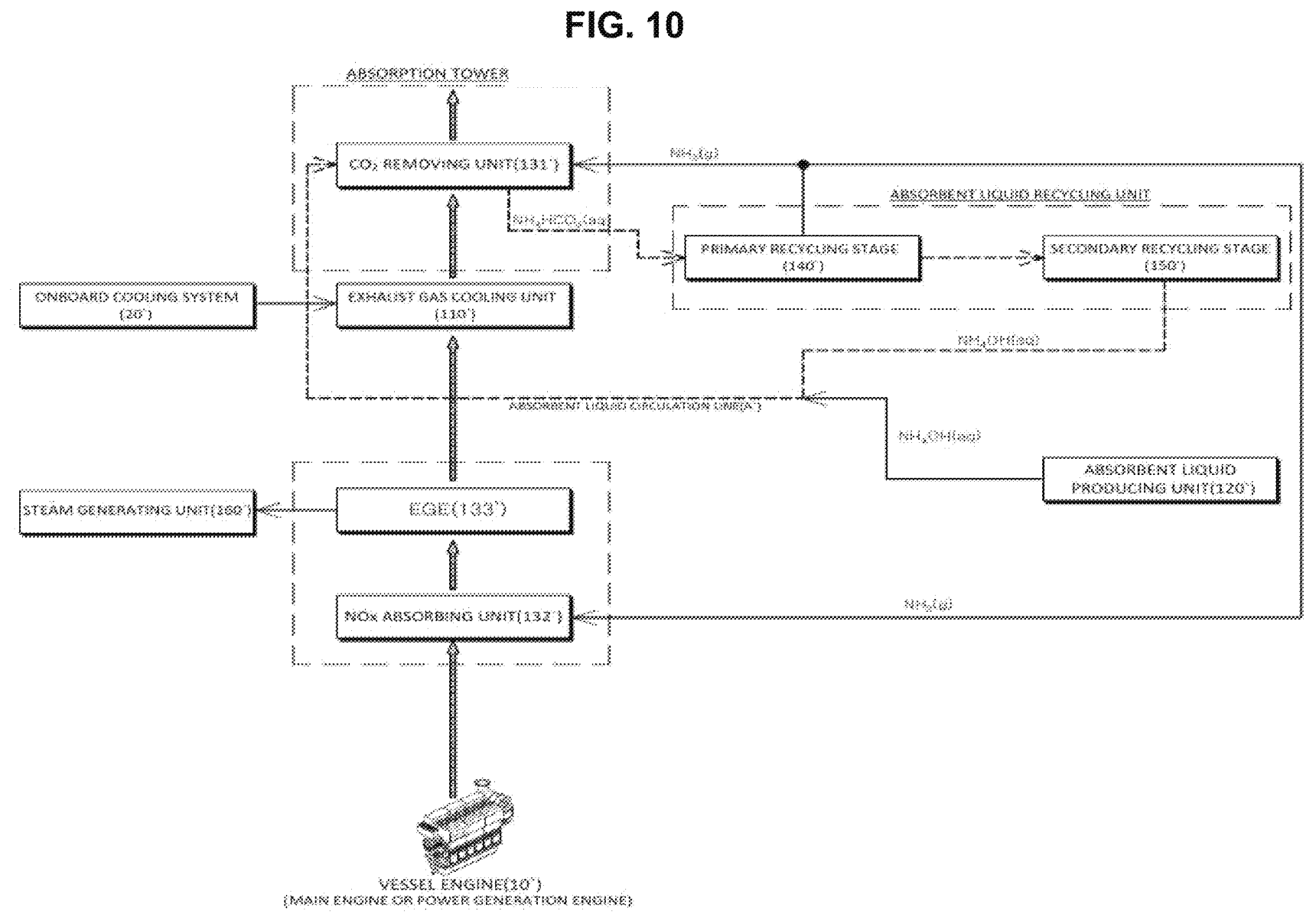

Referring to FIG. 10, an apparatus for reducing greenhouse gas emission in a vessel according to still another embodiment of the present invention may include: an exhaust gas cooling unit 110' that cools exhaust gas discharged from a vessel engine 10'; an absorbent liquid producing unit 120' that produces a high-concentration $CO_2$ absorbent liquid and supplies the high-concentration $CO_2$ absorbent liquid to an absorption tower 130'; the absorption tower 130' including a $CO_2$ removing unit 131' that removes $CO_2$ by reacting the exhaust gas cooled by the exhaust gas cooling unit 110' with the absorbent liquid supplied from the absorbent liquid producing unit 120' to convert $CO_2$ into an aqueous ammonium salt solution; and an absorbent liquid recycling unit including a primary recycling stage 140' that primarily recycles the absorbent liquid by reacting the aqueous ammonium salt solution discharged from the absorption tower 130' with an aqueous divalent metal hydroxide solution, and a secondary recycling stage 150' that secondarily recycles the high-concentration absorbent liquid by additionally reacting the unreacted aqueous ammonium salt solution supplied from the primary recycling stage 140' with an aqueous divalent metal hydroxide solution and circulates and supplies the high-concentration absorbent liquid to the absorption tower 130' for reuse as the absorbent liquid. Therefore, the exhaust gas is cooled by a heat exchange method, thereby preventing the decrease in the concentration of the absorbent liquid, and the absorbent liquid recycling unit is provided in two or more stages so that the unreacted aqueous ammonium salt solution remaining in the ammonia water is removed to increase the recovery rate of the absorbent liquid, thereby preventing the deterioration in greenhouse gas absorption performance.

Here, according to the type and specification of the vessel engine 10' (low-pressure engine or high-pressure engine) used in a main engine or power generation engine and the type of fuel supplied to the vessel engine 10' (HFO, MDO, LNG, MGO, LSMGO, ammonia, etc.), the absorption tower may optionally include, in addition to the $CO_2$ removing unit, a $NO_x$ absorbing unit or a $SO_x$ absorbing unit, or may include both the $NO_x$ absorbing unit and the $SO_x$ absorbing unit. In particular, when LNG is used as the fuel of the vessel engine 10', $SO_x$ is not generated, and thus a separate $SO_x$ absorbing unit need not be installed. However, when LSMGO is used, a small amount of $SO_x$ may be generated, and thus a $SO_x$ absorbing unit capable of simultaneously performing cooling of exhaust gas and absorption by dissolution of $SO_x$ may be additionally provided.

Hereinafter, an embodiment in which, when LNG or LSMGO is used as the fuel of the vessel engine 10', the $NO_x$ absorbing unit, the exhaust gas cooling unit, and the $CO_2$ removing unit are sequentially stacked on the absorption tower will be described, but the present invention is not limited thereto. As described above, the $NO_x$ absorbing unit and/or the $SO_x$ absorbing unit may or may not be included according to the types of vessel engine and fuel.

First, the exhaust gas cooling unit 110' cools exhaust gas discharged from the vessel engine 10' so that temperature of the exhaust gas is lowered to facilitate absorption of $CO_2$ by a greenhouse gas absorbent liquid.

For example, the exhaust gas cooling unit 110' may cool the exhaust gas discharged from the vessel engine 10' by a heat exchange method of the fresh water. Specifically, the exhaust gas may be cooled with the fresh water by the heat exchange method to a temperature of 27° C. to 33° C., which is required by the $CO_2$ removing unit 131', by circulating the fresh water provided from an onboard cooling system 20' through a heat exchange pipe 111' surrounding an exhaust gas discharge pipe through which the exhaust gas flows.

That is, in a water cooling method in which the exhaust gas is directly cooled by the fresh water, the concentration of the absorbent liquid is lowered due to the addition of the fresh water, resulting in the deterioration in the greenhouse gas absorption performance. By improving the water cooling method, the exhaust gas is cooled by a heat exchange method without direct contact with the fresh water, thereby preventing the decrease in the concentration of the absorbent liquid and preventing the deterioration in greenhouse gas absorption performance.

On the other hand, an example in which the exhaust gas cooling unit 110' performs cooling by the heat exchange method using the fresh water has been described, but various cooling media and cooling methods may be applied.

Next, the absorbent liquid producing unit 120' produces a high-concentration $CO_2$ absorbent liquid and supplies the high-concentration $CO_2$ absorbent liquid to the absorption tower 130'. The absorbent liquid producing unit 120' reacts fresh water with $NH_3$ as shown in [Chemical Formula 4] below to produce high-concentration ammonia water $(NH_4OH(aq))$, which is a high-concentration $CO_2$ absorbent liquid, and supplies the high-concentration ammonia water $(NH_4OH(aq))$ through the absorbent liquid storage tank 153' to the $CO_2$ removing unit 131' of the absorption tower 130' along the absorbent liquid circulation line (see A' in FIG. 10).

$$NH_3 + H_2O \rightarrow NH_4OH(aq), \text{ (exotherm is reaction, 1650 MJ/ton)} \quad \text{[Chemical Formula 4]}$$

Figure 11:
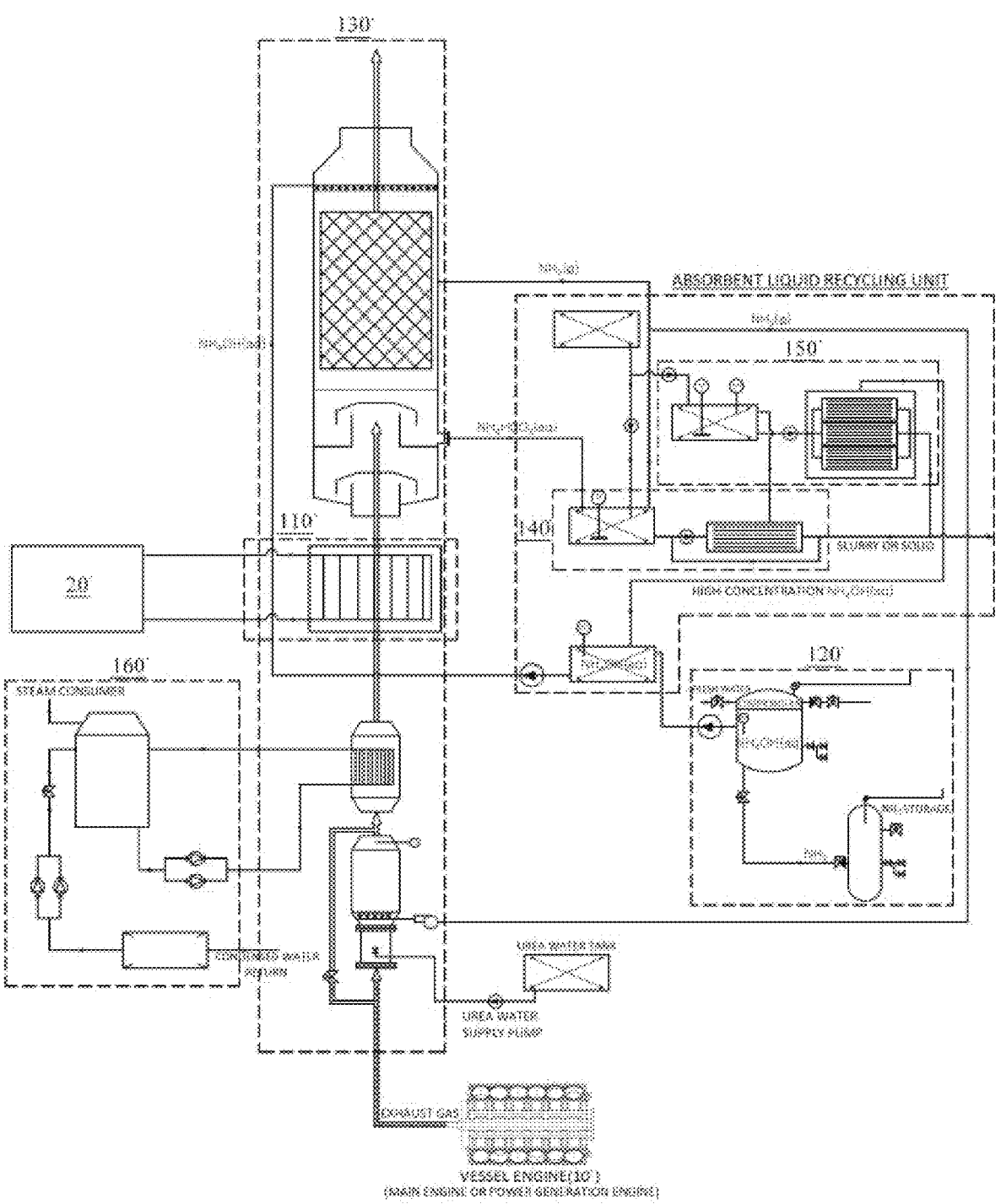
FIG. 11 is a circuit diagram of a system implementing the apparatus for reducing greenhouse gas emission in a vessel according to another embodiment, illustrated in FIG. 10.
Figure 13:
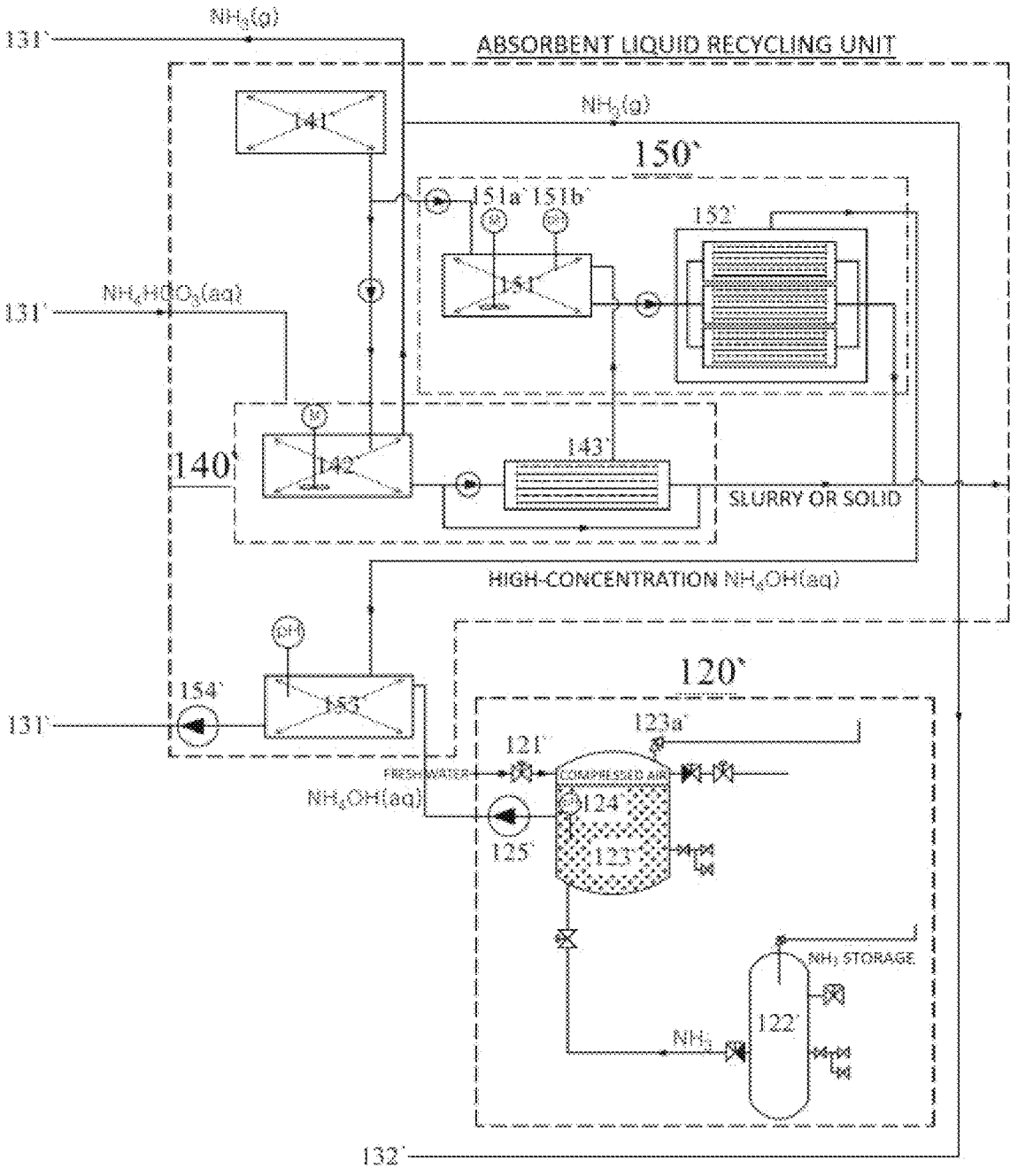
FIG. 13 separately illustrates an absorbent liquid producing unit and an absorbent liquid recycling unit of the apparatus for reducing greenhouse gas emission in a vessel according to another embodiment, illustrated in FIG. 11.

Specifically, as illustrated in FIGS. 11 and 13, the absorbent liquid producing unit 120' may include: a fresh water tank (not illustrated) that stores fresh water; a fresh water control valve 121' that supplies the fresh water from the fresh water tank to an ammonia water tank 123' by controlling a supply amount of the fresh water; a $NH_3$ storage 122' that stores high-pressure $NH_3$; an ammonia water tank 123' that produces and stores high-concentration ammonia water by spraying $NH_3$ supplied from the $NH_3$ storage 122' to the fresh water supplied by the fresh water control valve 121'; a pH sensor 124' that measures and monitors the concentration of the ammonia water in the ammonia water tank 123'; and an ammonia water supply pump 125' that supplies the high-concentration ammonia water from the ammonia water tank 123' to the secondary absorbent liquid storage tank 153'.

The concentration of the ammonia water circulating through the absorption tower 130' and the absorbent liquid recycling unit along the absorbent liquid circulation line A' changes as the operation is repeated. For example, the concentration of the ammonia water is reduced when $NH_3$ is supplied to the $NO_x$ absorbing unit 132' and used to absorb and remove $NO_x$, or when $NH_3$ passes through the absorption tower 130' and is exhausted together with the exhaust gas. When the concentration of the ammonia water is reduced, the absorbent liquid producing unit 120' supplies the high-concentration ammonia water to the absorbent liquid circulation line (see A' in FIG. 10) to compensate for the reduced concentration of the ammonia water so that the ammonia water is constantly maintained at a concentration designed as a preset absorption performance.

On the other hand, since the high-concentration ammonia water has a higher partial pressure of $NH_3(g)$ than that of the low-concentration ammonia water at the same temperature, $NH_3$ is relatively more evaporated in an atmospheric pressure state, resulting in an increase in loss. Therefore, in order to store the high-concentration ammonia water without loss, it is necessary to lower temperature in order for increasing the solubility of $NH_3(g)$ and reducing the vapor pressure of $NH_3(g)$ and to operate under a pressurization system.

That is, in order to prevent a phenomenon that $NH_3(g)$ is evaporated and lost, compressed air of a certain pressure may be injected into the upper portion of the ammonia water in the ammonia water tank 123' so that the pressure in the ammonia water tank 123' is maintained to be high, thereby constantly maintaining the concentration of the ammonia water with $NH_3$ of a high concentration, for example, 50% wt.

For example, since $NH_3$ may be stored in a liquid state at $-34°$ C. and 8.5 bar, 50% concentration of ammonia water may be stored in the ammonia water tank 123' by maintaining the inside of the ammonia water tank 123' at a constant pressure by using compressed air of 7 bar available in the vessel.

In addition, a safety valve 123a' for reducing the pressure by exhausting air to a safety area so as to prevent overpressure of the ammonia water tank 123' may be installed.

Next, the absorption tower 130' includes a $CO_2$ removing unit 131' that removes $CO_2$ by reacting the exhaust gas cooled by the exhaust gas cooling unit 110' with the ammonia water, which is the absorbent liquid initially supplied from the absorbent liquid producing unit 120' and circulating along the absorbent liquid circulation line A', to convert $CO_2$ into an aqueous ammonium salt solution ($NH_4HCO_3(aq)$) as shown in [Chemical Formula 5] below.

$$2NH_4OH + CO_2 \rightarrow (NH_4)_2CO_3 + H_2O$$

$$(NH_4)_2CO_3 + CO_2 + H_2O \rightarrow 2NH_4HCO_3 \qquad \text{[Chemical Formula 5]}$$

Figure 12:
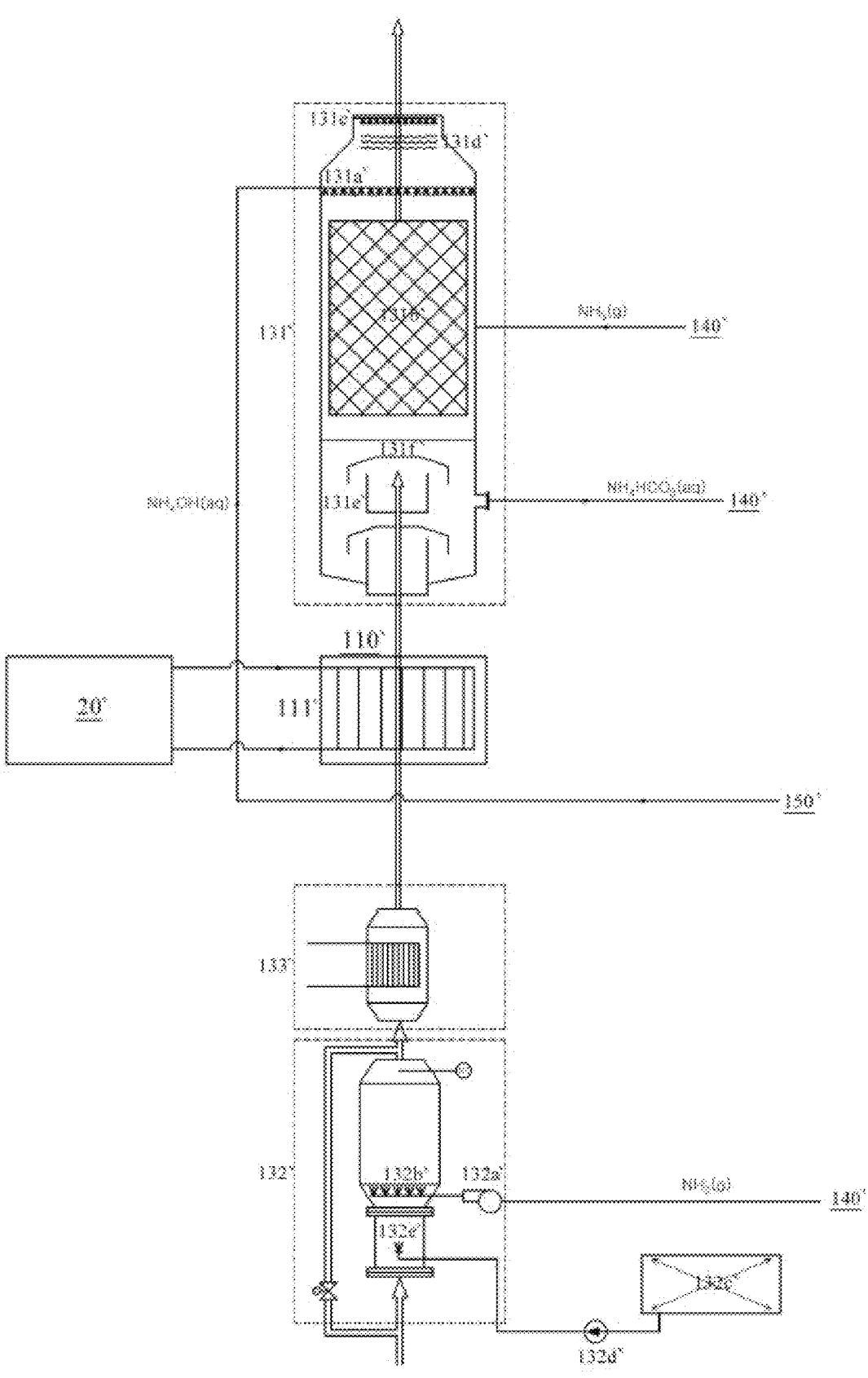
FIG. 12 separately illustrates an exhaust gas cooling unit and an absorption tower of the apparatus for reducing greenhouse gas emission in a vessel according to another embodiment, illustrated in FIG. 11.

Specifically, as illustrated in FIG. 12, the $CO_2$ removing unit 131' may include: an ammonia water spray nozzle 131a' that sprays the ammonia water supplied from the secondary absorbent liquid storage tank 153' downward toward a packing material 131b'; the packing material 131b' that contacts $CO_2$ of the exhaust gas with the ammonia water, which is the absorbent liquid, to convert $CO_2$ into $NH_4HCO_3$ (aq); a cooling jacket (not illustrated) that is formed in multi-stages for each section of an absorption apparatus filled with the packing material 131b' and cools heat generated by a $CO_2$ absorption reaction; a water spray 131c' that collects $NH_3$ discharged to the atmosphere without reacting with $CO_2$; a mist removal plate 131d' that is formed in a curved multi-plate shape and returns the ammonia water scattered when sprayed by the ammonia water spray nozzle 131a' toward the packing material 131b'; a partition wall 131e' that is formed so that the ammonia water passing through the packing material 131b' does not leak out and flow back toward the $NO_x$ absorbing unit 132'; and an umbrella-shaped blocking plate 131f that covers an upper end of an exhaust gas inlet hole surrounded by the partition wall 131e'.

Here, the cooling jacket may cool heat to 30° C. to 50° C. at which the material transfer is smoothest, so that $NH_3$ is not evaporated and lost while maintaining a $CO_2$ absorption rate at a certain level.

Figure 15:
FIG. 15 illustrates various packing materials applied to the apparatus for reducing greenhouse gas emission in a vessel according to another embodiment, illustrated in FIG. 11.
Figure 16:
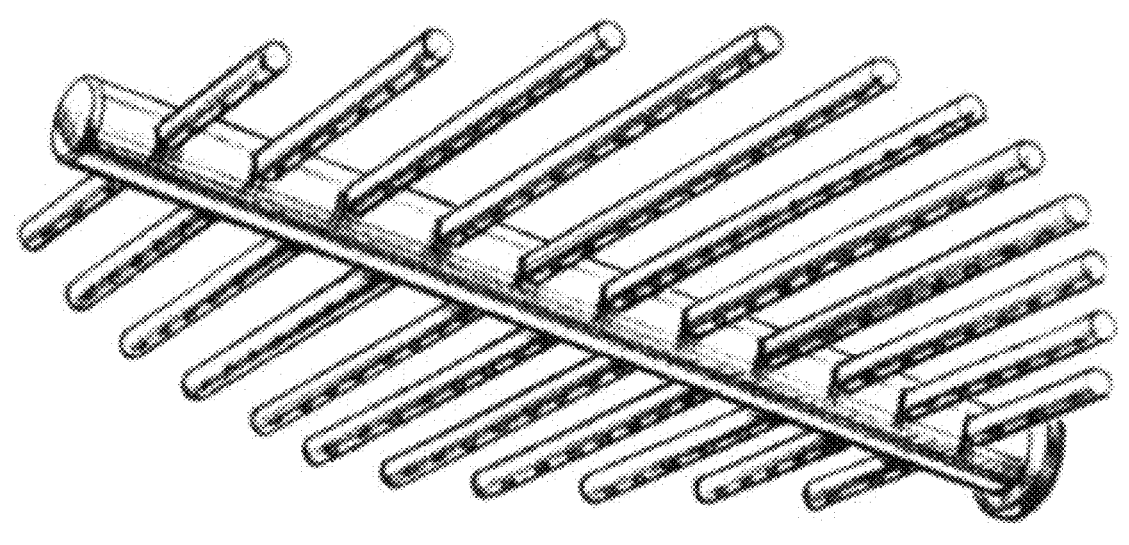
FIG. 16 illustrates an ammonia water spray nozzle applied to the apparatus for reducing greenhouse gas emission in a vessel according to another embodiment, illustrated in FIG. 11.
Figure 16:
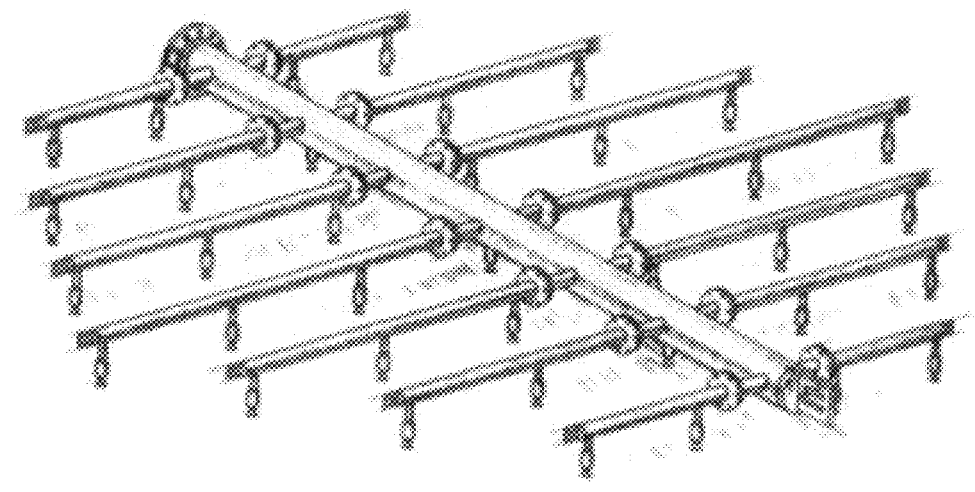

On the other hand, the $CO_2$ removing unit 131' may be considered in various forms so as to operate within an allowable pressure drop of an exhaust pipe required by an engine specification while increasing a contact area between the exhaust gas and $NH_3$. For example, the packing material 131b' may include multi-stage distilling column packings designed to increase a contact area per unit volume. As illustrated in FIG. 15, a distilling column packing suitable for an absorption process may be selected considering the contact area per unit area, the pressure drop of gas, and the flooding velocity. As illustrated in FIG. 16, the ammonia water spray nozzle 131a' may be provided in a ladder pipe form FIG. 16A or a spray form FIG. 16B.

In addition, a solution redistributor (not illustrated) may be formed between the distilling column packings so as to prevent channeling when the ammonia water passes downward through the packing material 131b', the exhaust gas passes upward through the packing material 131b', and the ammonia water and the exhaust gas contact each other.

In addition, the mist removal plate 131d' allows the scattered ammonia water to adhere to the curved multi-plate, so that droplets become large, and drains the ammonia water toward the packing material 131b' by the own weight thereof.

On the other hand, as described above, the vessel engine 10' is based on the premise of using LNG or LSMGO as fuel. When the vessel engine 10' uses LNG as fuel, $SO_x$ may not be generated, but when the vessel engine 10' uses LSMGO as fuel, $SO_x$ may be included in the exhaust gas, and thus the absorption tower 130' may include the $SO_x$ absorbing unit.

For example, although not separately illustrated, the $SO_x$ absorbing unit may dissolve and remove $SO_x$ while cooling the exhaust gas discharged from the vessel engine 10' through reaction with the seawater, and the $CO_2$ removing unit 131' may absorb and remove $CO_2$ by reacting the cooled exhaust gas, from which the $SO_x$ is removed, with the absorbent liquid supplied from the absorbent liquid producing unit 120' to convert $CO_2$ into an aqueous ammonium salt solution.

In addition, as described above, the absorption tower 130' may further include a $NO_x$ absorbing unit 132' that absorbs and removes $NO_x$ from the exhaust gas discharged from the vessel engine 10'. The exhaust gas from which the $NO_x$ has been removed may be cooled by the exhaust gas cooling unit 110', and $CO_2$ may be removed by reacting the cooled exhaust gas with the absorbent liquid supplied from the absorbent liquid producing unit 120' to convert $CO_2$ into an aqueous ammonium salt solution.

That is, in the absorption tower 130', the $NO_x$ absorbing unit 132' that absorbs and removes $NO_x$ from the exhaust gas discharged from the vessel engine 10', and the $CO_2$ removing unit 131' that removes $CO_2$ by reacting the cooled exhaust gas, from which the $NO_x$ has been removed, with the ammonia water supplied from the absorbent liquid producing unit 120' to convert $CO_2$ into $NH_4HCO_3(aq)$ are stacked to sequentially absorb and remove the $NO_x$ and the $CO_2$ from the exhaust gas.

Therefore, since the $CO_2$ removing unit 131' reacts the ammonia water with the exhaust gas from which the $NO_x$ has been removed by the $NO_x$ absorbing unit 132', side reactions caused by $NO_x$ do not occur during the $CO_2$ removal process, thereby minimizing the generation of impurities and obtaining $NH_4HCO_3(aq)$ with less impurities in a subsequent process.

Here, the absorption tower 130' may include the $CO_2$ removing unit 131', the $NO_x$ absorbing unit 132', and an EGE 133' to be described later, may be modularized and combined with individual modules, and may be integrated in a single tower form, and the absorption tower 130' itself may include a single tower or a group of a plurality of towers.

Specifically, the $NO_x$ absorbing unit 132' is an SCR. As illustrated in FIG. 12, the $NO_x$ absorbing unit 132' may absorb $NO_x$ by directly supplying the recycled $NH_3$ from the primary recycling stage 140' to a $NH_3$ spray nozzle 132b' through a blower 132a' or a compressor, or when $NH_3$ supplied to the $NH_3$ spray nozzle 132b' is insufficient, may receive urea water of a urea water storage tank 132c from a $NH_3$ spray nozzle 132e' through a urea water supply pump 132d' so as to compensate for the loss or lack of $NH_3$.

On the other hand, since $NH_3$ and $CO_2$ are generated when the urea water is decomposed, it may be preferable that $NH_3$ is directly supplied to reduce the amount of $CO_2$ generated.

In addition, the absorption tower 130' may further include an EGE 133' that is formed between the $NO_x$ absorbing unit 132' and the exhaust gas cooling unit 110' and performs heat exchange between waste heat of the exhaust gas from the vessel engine 10' and boiler water.

Next, the absorbent liquid recycling unit may recycle $NH_3$ and return $NH_3$ back to the absorption tower 130' for reuse as a $CO_2$ absorbent liquid, may store $CO_2$ in the form of $CaCO_3(s)$ or $MgCO_3(s)$ or discharge $CO_2$ to the outside of the vessel, or may supply the recycled $NH_3$ to the $NO_x$ absorbing unit 132' so as to absorb $NO_x$.

That is, the absorbent liquid recycling unit may include: a primary recycling stage 140' that primarily recycles the absorbent liquid by reacting the aqueous ammonium salt solution, which is discharged from the absorption tower 130' after the absorption of $CO_2$, with an aqueous divalent metal hydroxide solution; and a secondary recycling stage 150' that secondarily recycles the high-concentration absorbent liquid by additionally reacting the aqueous divalent metal hydroxide solution with an unreacted aqueous ammonium salt solution supplied from the primary recycling stage 140' and circulates and supplies the secondarily recycled absorbent liquid to the absorption tower 130' for reuse as the absorbent liquid. A recovery rate of the absorbent liquid may be increased and maintained at a certain concentration, thereby effectively preventing the deterioration in absorption performance.

Specifically, as illustrated in FIG. 13, the absorbent liquid recycling unit may include: a storage tank 141' that stores an aqueous divalent metal hydroxide solution; a primary recycling stage 140' including a mixing tank 142' in which the aqueous ammonium salt solution discharged from the absorption tower 130' and the aqueous divalent metal hydroxide solution supplied from the storage tank 141' are stirred by an agitator to generate $NH_3(g)$ and carbonate as shown in [Chemical Formula 6] below, and a primary filter 143' that suctions a solution and precipitate from the mixing tank 142' and separates the carbonate and ammonia water (or fresh water); and a secondary recycling stage 150' including a primary absorbent liquid storage tank 151' that stores an unreacted aqueous ammonium salt solution remaining without reacting with the ammonia water and the aqueous divalent metal hydroxide solution separated by the primary filter 143' and re-reacting the unreacted aqueous ammonium salt solution with the aqueous divalent metal hydroxide solution supplied from the storage tank 141', a secondary filter 152' that suctions the solution and precipitate from the primary absorbent liquid storage tank 151' to separate carbonate and high-concentration ammonia water and is designed corresponding to the capacity of the primary absorbent liquid storage tank 151', a secondary absorbent liquid storage tank 153' that stores the high-concentration ammonia water separated by the secondary filter 152', and an ammonia water circulation pump 154' that pumps and circulates the ammonia water from the secondary absorbent liquid storage tank 153' to the $CO_2$ removing unit 131' of the absorption tower 130'.

$$NH_4HCO_3+Ca(OH)_2 \leftrightarrow CaCO_3(s)+2H_2O+NH_3(g)$$

$$NH_4HCO_3+Mg(OH)_2 \leftrightarrow MgCO_3(s)+ \\ 2H_2O+NH_3(g) \qquad \text{[Chemical Formula 6]}$$

Here, the storage capacity of the primary absorbent liquid storage tank 151' is designed to be at least three times the capacity of the absorbent liquid circulating through the absorption tower 130' and the absorbent liquid recycling unit along the absorbent liquid circulation line A', and thus has a relatively large capacity compared to the capacity of the circulating absorbent liquid. The stay time of the unreacted aqueous ammonium salt solution in the primary absorbent liquid storage tank 151' is increased to sufficiently secure the reaction time. Therefore, the unreacted aqueous ammonium salt solution may be converted into carbonate as much as possible.

Accordingly, the unreacted aqueous ammonium salt solution remaining in ammonia water is re-reacted in the primary absorbent liquid storage tank 151' to additionally generate ammonia water, thereby maintaining the concentration of the ammonia water at a certain level.

That is, in the mixing tank 142', the aqueous divalent metal hydroxide solution frequently changes while passing through the filter due to the influence of the reaction rate, the evaporation of ammonia, and the like. When the generation of carbonate is not completed, a considerable amount of the unreacted aqueous ammonium salt solution remains in the ammonia water, resulting in the reduction in the $CO_2$ absorption rate. Therefore, by designing a large-capacity primary absorbent liquid storage tank 151', the ammonia water recovery rate is increased by allowing reaction for a sufficient time and passing through the secondary filter 152' again. The concentration of the ammonia water may be maintained at a certain level at which the ammonia water can function as an effective absorbing liquid.

In addition, $NH_3(g)$ generated in the mixing tank 142' may be supplied to the $CO_2$ removing unit 131' of the absorption tower 130' and used to remove $CO_2$, or may be supplied to the $NO_x$ absorbing unit 132' and used to remove $NO_x$.

On the other hand, the primary absorbent liquid storage tank 151' may include: an agitator 151a' that stirs and reacts the aqueous divalent metal hydroxide solution and the unreacted aqueous ammonium salt solution; and a pH sensor 151b' that measures the degree of reaction by the agitator 151a'.

In addition, the aqueous divalent metal hydroxide solution stored in the storage tank 141' may be $Ca(OH)_2$ or $Mg(OH)_2$ produced by reacting the fresh water with CaO or MgO.

For example, when the concentration of the ammonia water circulating through the absorbent liquid circulation line A' is low, the amount of $(NH_4)_2CO_3$ produced in [Chemical Formula 5] decreases, resulting in an increase in the amount of $CO_2$ emitted. When the concentration of the ammonia water is high, the amount of carbonate produced increases more than necessary due to excessive $CO_2$ absorption. Thus, it is necessary to constantly maintain the concentration of the ammonia water at an appropriate level so that the $CO_2$ absorption performance of the absorption tower 130' is not deteriorated. In order to achieve this purpose, the concentration of the ammonia water may be designed to be adjusted to 12% by mass, but the present invention is not limited thereto and the concentration of the ammonia water may be changed according to the conditions of use.

In addition, a separate storage tank (not illustrated) that stores carbonate ($CaCO_3(s)$ or $MgCO_3(s)$), which is separated by the primary filter 143' and the secondary filter 152' and can be discharged to the sea, in a slurry state or a solid state transferred to a dryer (not illustrated) and solidified may be provided, and carbonate ($CaCO_3(s)$ or $MgCO_3(s)$) may be discharged to the outside of the vessel without being stored. Here, as an example of the primary filter 143' and the secondary filter 152', a membrane filter suitable for precipitate separation by high-pressure fluid transfer may be applied.

In addition, the ammonia water circulation pump 154' may be provided as a centrifugal pump-type pump so that a large amount of ammonia water circulates through the absorbent liquid circulation line A'.

On the other hand, the fresh water or the ammonia water separated by the primary filter 143' and the secondary filter 152' is supplied to the secondary absorbent liquid storage tank 153', or surplus fresh water additionally generated by the mixing tank 142' relative to the total circulating fresh water is stored in a fresh water tank (not illustrated) and reused when the aqueous divalent metal hydroxide solution is generated in the storage tank 141', thereby saving the fresh water.

In this manner, since only the relatively inexpensive metal oxide (CaO or MgO) or aqueous divalent metal hydroxide solution ($Ca(OH)_2$ or $Mg(OH)_2$) is added, no additional addition of water is required, there is no decrease in the concentration of ammonia water, the capacity sizes of the primary filter 143' and the secondary filter 152' may be reduced, and the $NH_3$ recycling cost may be reduced. That is, in theory, only the metal oxide is consumed and $NH_3$ and fresh water are reused, thereby significantly reducing the $CO_2$ removal cost.

Figure 14:
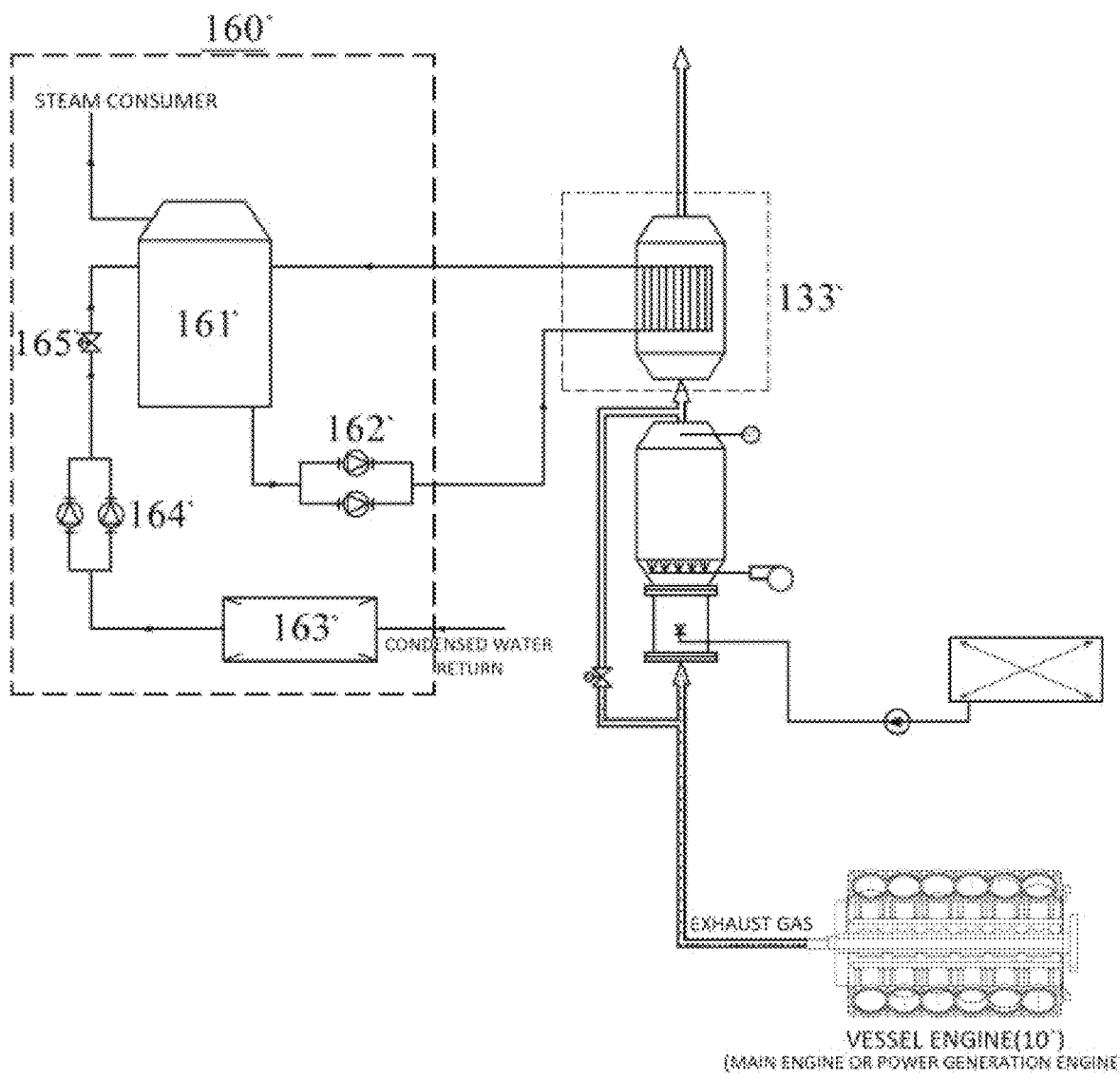
FIG. 14 separately illustrates a steam generating unit of the apparatus for reducing greenhouse gas emission in a vessel according to another embodiment, illustrated in FIG. 11.

Next, as illustrated in FIG. 14, the steam generating unit 160' may include: an auxiliary boiler 161' that receives a mixture in the form of saturated water and steam heat-exchanged through the EGE 133', separates the steam by a steam drum (not illustrated), and supplies the separated steam to a steam consumer; a boiler water circulating pump 162' that circulates and supplies boiler water from the auxiliary boiler 161' to the EGE 133'; a cascade tank 163' that recovers condensed water condensed and phase-changed after being consumed from the steam consumer; and a supply pump 164' and a control valve 165' that supply boiler water from the cascade tank 163' to the auxiliary boiler 161' while controlling the amount of boiler water. The steam generating unit 160' generates and supplies steam required for heating devices in the vessel.

Here, when the load of the vessel engine 10' is large, the amount of heat that may be provided from the exhaust gas is large, and thus the amount of steam required in the vessel may be sufficiently produced through the EGE 133'; otherwise, the auxiliary boiler 161' itself may burn fuel to produce necessary steam.

On the other hand, according to still another embodiment of the present invention, a vessel including the apparatus for reducing greenhouse gas emission may be provided.

Therefore, the apparatus for reducing greenhouse gas emission in the vessel has the following effects. The exhaust gas may be cooled by a heat exchange method, thereby preventing the decrease in the concentration of the absorbent liquid. A pressurization system may be applied to prevent the loss of absorbent liquid due to the natural evaporation of high-concentration absorbent liquid. The absorbent liquid recycling unit may be provided in two or more stages so that the unreacted aqueous ammonium salt solution remaining in the ammonia water is removed to maintain the concentration of the ammonia water at a certain level, thereby increasing the recovery rate of the absorbent liquid and preventing the deterioration in greenhouse gas absorption performance. In order to satisfy the IMO greenhouse gas emission regulations, greenhouse gas may be converted into materials that do not affect environments and then separately discharged or may be converted into useful materials and then stored. $NH_3$ may be recycled to minimize consumption of relatively expensive $NH_3$. The capacity size of the rear end of the filter may be reduced. Greenhouse gas may be stored in the form of carbonate that exists in a natural state so that greenhouse gas may be discharged to the sea. Side reactions caused by $SO_x$ remaining during $NH_3$ recycling may be removed, thereby minimizing the loss of $NH_3$ and preventing impurities from being included when recovering ammonia.

The present invention has been described above with reference to the embodiments illustrated in the drawings. However, the present invention is not limited thereto, and various modifications or other embodiments falling within the scope equivalent to the present invention can be made by those of ordinary skill in the art. Therefore, the true scope of protection of the present invention should be determined by the appended claims.

The invention claimed is:

1. An apparatus for reducing greenhouse gas emission in a vessel, the apparatus comprising:
    a seawater supply unit that supplies seawater;
    an absorbent liquid producing unit that produces and supplies a high-concentration $CO_2$ absorbent liquid;
    an absorption tower comprising a $CO_2$ removing unit that cools exhaust gas discharged from a vessel engine by reacting the exhaust gas with the seawater supplied from the seawater supply unit, and removes $CO_2$ by reacting the cooled exhaust gas with the absorbent liquid supplied from the absorbent liquid producing unit to convert $CO_2$ into an aqueous ammonium salt solution; and
    an absorbent liquid recycling unit comprising a primary recycling unit that primarily recycles the absorbent liquid by reacting the aqueous ammonium salt solution discharged from the absorption tower with an aqueous divalent metal hydroxide solution, and a secondary recycling unit that secondarily recycles the high-concentration absorbent liquid by additionally reacting the aqueous divalent metal hydroxide solution with an unreacted aqueous ammonium salt solution supplied from the primary recycling unit and circulates and supplies the recycled absorbent liquid to the absorption tower for reuse as the absorbent liquid.

2. The apparatus according to claim 1, wherein the absorbent liquid recycling unit comprises:
    a storage tank that stores the aqueous divalent metal hydroxide solution;
    the primary recycling unit comprising a mixing tank in which the aqueous divalent metal hydroxide solution and the aqueous ammonium salt solution discharged from the absorption tower are stirred by an agitator to generate $NH_3(g)$ and carbonate, and a primary filter that suctions a solution and precipitate from the mixing tank and separates the carbonate; and a secondary recycling unit comprising a primary absorbent liquid storage tank that stores the unreacted aqueous ammonium salt solution or the ammonia water separated by the primary filter and re-reacts the unreacted aqueous ammonium salt solution with the aqueous divalent metal hydroxide solution supplied from the storage tank, a secondary filter that suctions the solution and precipitate from the primary absorbent liquid storage tank to separate carbonate and high-concentration ammonia water, and a secondary absorbent liquid storage tank that stores the high-concentration ammonia water separated by the secondary filter.

3. The apparatus according to claim 2, wherein the primary absorbent liquid storage tank comprises:

an agitator that stirs and reacts the aqueous divalent metal hydroxide solution and the unreacted aqueous ammonium salt solution or the ammonia water separated by the primary filter; and a pH sensor that measures the degree of reaction by the agitator.

4. The apparatus according to claim 2, wherein fresh water or ammonia water separated by the secondary filter is supplied to the secondary absorbent liquid storage tank, or surplus fresh water additionally generated by the mixing tank relative to a total circulating fresh water is stored in a fresh water tank and reused when the aqueous divalent metal hydroxide solution is generated in the storage tank.

5. The apparatus according to claim 1, wherein the absorption tower further comprises a $SO_x$ absorbing unit that dissolves and removes $SO_x$ while cooling the exhaust gas discharged from the vessel engine by reacting the exhaust gas with the seawater supplied from the seawater supply unit, and the $CO_2$ removing unit cools the exhaust gas, from which the $SO_x$ has been removed, by reacting the exhaust gas with the seawater supplied from the seawater supply unit and removes $CO_2$ by reacting the cooled exhaust gas with the absorbent liquid supplied from the absorbent liquid producing unit to convert $CO_2$ into the aqueous ammonium salt solution.

6. The apparatus according to claim 1, wherein the absorption tower further comprises a $NO_x$ absorbing unit that absorbs and removes $NO_x$ from the exhaust gas emitted from the vessel engine, and the $CO_2$ removing unit cools the exhaust gas, from which the $NO_x$ has been removed, by reacting the exhaust gas with the seawater supplied from the seawater supply unit and removes $CO_2$ by reacting the cooled exhaust gas with the absorbent liquid supplied from the absorbent liquid producing unit to convert $CO_2$ into the aqueous ammonium salt solution.

7. The apparatus according to claim 1, wherein, in the absorption tower, a $NO_x$ absorbing unit that absorbs and removes $NO_x$ from the exhaust gas discharged from the vessel engine, a $SO_x$ absorbing unit that dissolves and removes $SO_x$ while cooling the exhaust gas, from which the $NO_x$ has been removed, through reaction with the seawater supplied from the seawater supply unit, and the $CO_2$ removing unit that removes $CO_2$ by reacting the exhaust gas, from which the $SO_x$ has been removed, with the absorbent liquid supplied from the absorbent liquid producing unit to convert $CO_2$ into the aqueous ammonium salt solution are sequentially stacked.

8. The apparatus according to claim 6, wherein $NH_3$ recycled by the absorbent liquid recycling unit is returned back to the absorption tower and converted into the absorbent liquid for reuse as the absorbent liquid, and the $NO_x$ absorbing unit receives the $NH_3$ recycled by the absorbent liquid recycling unit to absorb $NO_x$ with the $NH_3$, or absorbs $NO_x$ using urea water.

9. The apparatus according to claim 2, wherein the absorbent liquid producing unit comprises:

a fresh water tank that stores fresh water;

a fresh water control valve that supplies the fresh water from the fresh water tank;

a $NH_3$ storage that stores high-pressure $NH_3$, an ammonia water tank that produces and stores high-concentration ammonia water, which is the absorbent liquid, by spraying the $NH_3$ supplied from the $NH_3$ storage to the fresh water supplied by the fresh water control valve;

a pH sensor that measures a concentration of the ammonia water in the ammonia water tank; and an ammonia water supply pump that supplies the ammonia water from the ammonia water tank to the secondary absorbent liquid storage tank.

10. The apparatus according to claim 1, wherein the $CO_2$ removing unit comprises:

an ammonia water spray nozzle that sprays the absorbent liquid supplied from the absorbent liquid recycling unit downward;

a packing material that contacts the $CO_2$ with the ammonia water, which is the absorbent liquid, to convert the $CO_2$ into $NH_4HCO_3(aq)$;

a cooling jacket that is formed in multi-stages for each section of an absorption apparatus filled with the packing material and cools heat generated by a $CO_2$ absorption reaction;

a water spray that collects $NH_3$ discharged to the outside without reacting with $CO_2$;

a mist removal plate that is formed in a curved multi-plate shape and returns the ammonia water toward the packing material;

a partition wall that is formed so that the ammonia water does not flow back; and an umbrella-shaped blocking plate that covers an exhaust gas inlet hole surrounded by the partition wall.

11. An apparatus for reducing greenhouse gas emission in a vessel, the apparatus comprising:

an exhaust gas cooling unit that cools exhaust gas discharged from a vessel engine;

an absorbent liquid producing unit that produces and supplies a high-concentration $CO_2$ absorbent liquid;

an absorption tower comprising a $CO_2$ removing unit that removes $CO_2$ by reacting the exhaust gas cooled by the exhaust gas cooling unit with the absorbent liquid supplied from the absorbent liquid producing unit to convert $CO_2$ into an aqueous ammonium salt solution; and an absorbent liquid recycling unit comprising a primary recycling stage that primarily recycles the absorbent liquid by reacting the aqueous ammonium salt solution discharged from the absorption tower with an aqueous divalent metal hydroxide solution, and a secondary recycling stage that secondarily recycles the high-concentration absorbent liquid by additionally reacting the aqueous divalent metal hydroxide solution with an unreacted aqueous ammonium salt solution supplied from the primary recycling stage and circulates and supplies the recycled absorbent liquid to the absorption tower for reuse as the absorbent liquid.

12. The apparatus according to claim 11, wherein the vessel engine uses liquefied natural gas (LNG) or low sulphur marine gas oil (LSMGO) as fuel.

13. The apparatus according to claim 11, wherein the exhaust gas cooling unit cools the exhaust gas to a temperature of 27° C. to 33° C. by circulating fresh water supplied from an onboard cooling system through a heat exchange pipe surrounding an exhaust gas discharge pipe.

14. The apparatus according to claim 11, wherein the absorbent liquid recycling unit comprises:

a storage tank that stores the aqueous divalent metal hydroxide solution;

the primary recycling stage comprising a mixing tank in which the aqueous ammonium salt solution discharged from the absorption tower and the aqueous divalent metal hydroxide solution supplied from the storage tank are stirred by an agitator to generate $NH_3$ $(g)$ and carbonate, and a primary filter that suctions a solution and precipitate from the mixing tank and separates the carbonate; and the secondary recycling stage comprising a primary absorbent liquid storage tank that stores the unreacted aqueous ammonium salt solution or the ammonia water separated by the primary filter and re-reacts the unreacted aqueous ammonium salt solution with the aqueous divalent metal hydroxide solution supplied from the storage tank, a secondary filter that suctions the solution and precipitate from the primary absorbent liquid storage tank to separate carbonate and high-concentration ammonia water, and a secondary absorbent liquid storage tank that stores the high-concentration ammonia water separated by the secondary filter.

15. The apparatus according to claim 14, wherein the primary absorbent liquid storage tank comprises:

an agitator that stirs and reacts the aqueous divalent metal hydroxide solution supplied from the storage tank and the unreacted aqueous ammonium salt solution or the ammonia water separated by the primary filter; and a pH sensor that measures the degree of reaction by the agitator.

16. The apparatus according to claim 14, wherein fresh water or ammonia water separated by the secondary filter is supplied to the secondary absorbent liquid storage tank, or surplus fresh water additionally generated by the mixing tank relative to a total circulating fresh water is stored in a fresh water tank and reused when the aqueous divalent metal hydroxide solution is generated in the storage tank.

17. The apparatus according to claim 11, wherein the absorption tower further comprises a $NO_x$ absorbing unit that absorbs and removes $NO_x$ from the exhaust gas emitted from the vessel engine, and the $CO_2$ removing unit removes $CO_2$ by reacting the exhaust gas, from which the $NO_x$ has been removed and which is cooled by the exhaust gas cooling unit, with the absorbent liquid supplied from the absorbent liquid producing unit to convert $CO_2$ into the aqueous ammonium salt solution.

18. The apparatus according to claim 17, wherein the absorbent liquid recycling unit recycles $NH_3$ and returns the $NH_3$ back to the absorption tower for reuse as the absorbent liquid, and the $NO_x$ absorbing unit absorbs $NO_x$ with the $NH_3$ supplied from the absorbent liquid recycling unit, or absorbs $NO_x$ using urea water.

19. The apparatus according to claim 14, wherein the absorbent liquid producing unit comprises:

a fresh water tank that stores fresh water;

a fresh water control valve that controls an amount of the fresh water supplied from the fresh water tank;

a $NH_3$ storage that stores high-pressure $NH_3$;

an ammonia water tank that produces and stores high-concentration ammonia water, which is the absorbent liquid, by spraying the $NH_3$ supplied from the $NH_3$ storage to the fresh water supplied by the fresh water control valve;

a pH sensor that measures a concentration of the ammonia water in the ammonia water tank; and an ammonia water supply pump that supplies the ammonia water from the ammonia water tank to the secondary absorbent liquid storage tank.

20. The apparatus according to claim 11, wherein the $CO_2$ removing unit comprises:

an ammonia water spray nozzle that sprays the absorbent liquid supplied from the absorbent liquid recycling unit downward;

a packing material that contacts the $CO_2$ with the ammonia water, which is the absorbent liquid, to convert the $CO_2$ into $NH_4HCO_3$(aq);

a cooling jacket that is formed in multi-stages for each section of an absorption apparatus filled with the packing material and cools heat generated by a $CO_2$ absorption reaction;

a water spray that collects $NH_3$ discharged to the outside without reacting with $CO_2$;

a mist removal plate that is formed in a curved multi-plate shape and returns the ammonia water toward the packing material;

a partition wall that is formed so that the ammonia water does not leak out; and an umbrella-shaped blocking plate that covers an exhaust gas inlet hole surrounded by the partition wall.

\* \* \* \* \*